United States Patent [19]

Nagane

[11] Patent Number: 4,783,700
[45] Date of Patent: Nov. 8, 1988

[54] IMAGE SENSOR UNIT AND IMAGE READING APPARATUS HAVING THE UNIT

[75] Inventor: Hiromichi Nagane, Tokyo, Japan

[73] Assignee: Canon Kabushiki Kaisha, Tokyo, Japan

[21] Appl. No.: 60,055

[22] Filed: Jun. 9, 1987

[30] Foreign Application Priority Data

| Jun. 10, 1986 | [JP] | Japan | 61-132862 |
| Jun. 10, 1986 | [JP] | Japan | 61-132863 |
| Jun. 10, 1986 | [JP] | Japan | 61-132864 |
| Jun. 10, 1986 | [JP] | Japan | 61-132867 |
| Sep. 5, 1986 | [JP] | Japan | 61-208039 |

[51] Int. Cl.$^4$ .................................... H04N 5/335
[52] U.S. Cl. ............................................ 358/213.11
[58] Field of Search ................. 250/522.1, 578; 358/213.11; 355/30; 346/160, 160.1

[56] References Cited

U.S. PATENT DOCUMENTS 4,672,219  6/1987  Iwabuchi et al. .............. 358/213.11

Primary Examiner—L. T. Hix
Assistant Examiner—David Porterfield
Attorney, Agent, or Firm—Fitzpatrick, Cella, Harper & Scinto

[57] ABSTRACT

There is disclosed an image ssensor unit comprising: illumination unit for illuminating light on an original; an image sensor for reading out image information on the original by reflection light of said illuminated light; holding for holding the illumination unit; and a mounting unit for causing the holding unit to hold the illumination unit so that the relative displacement between the illumination unit and said holding unit in a direction along a surface of the holding unit on which the illumination unit is held by the holding unit.

15 Claims, 20 Drawing Sheets

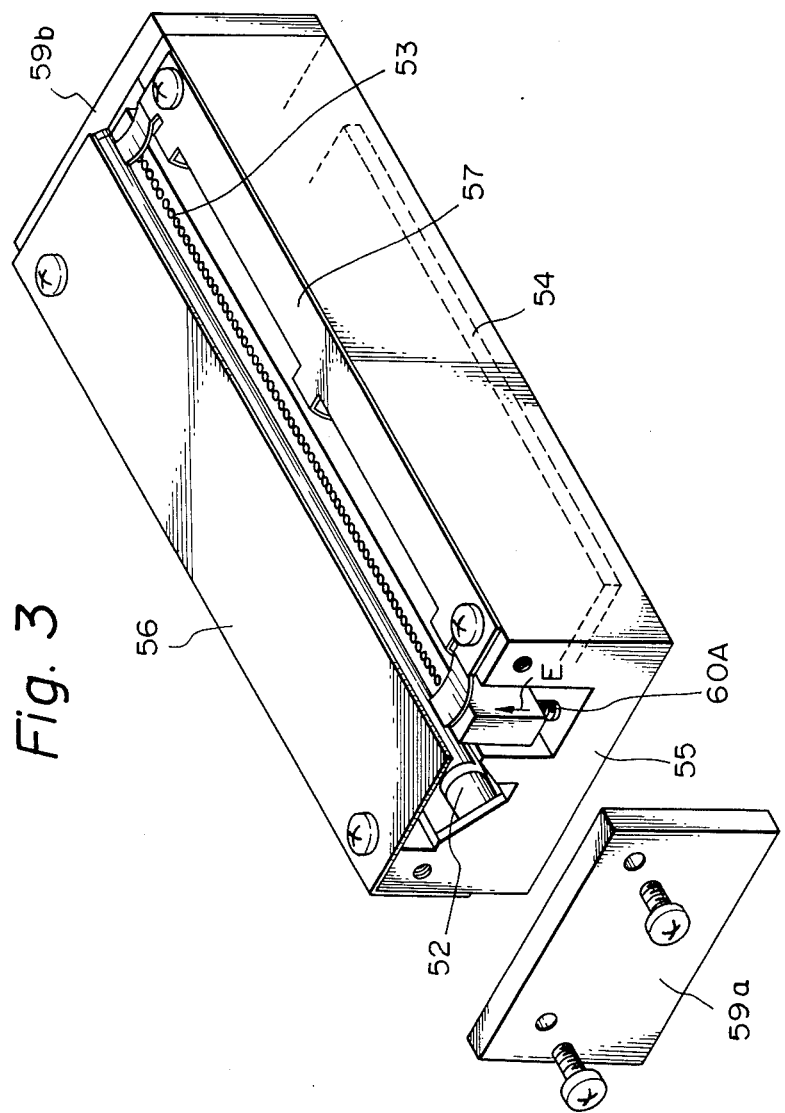

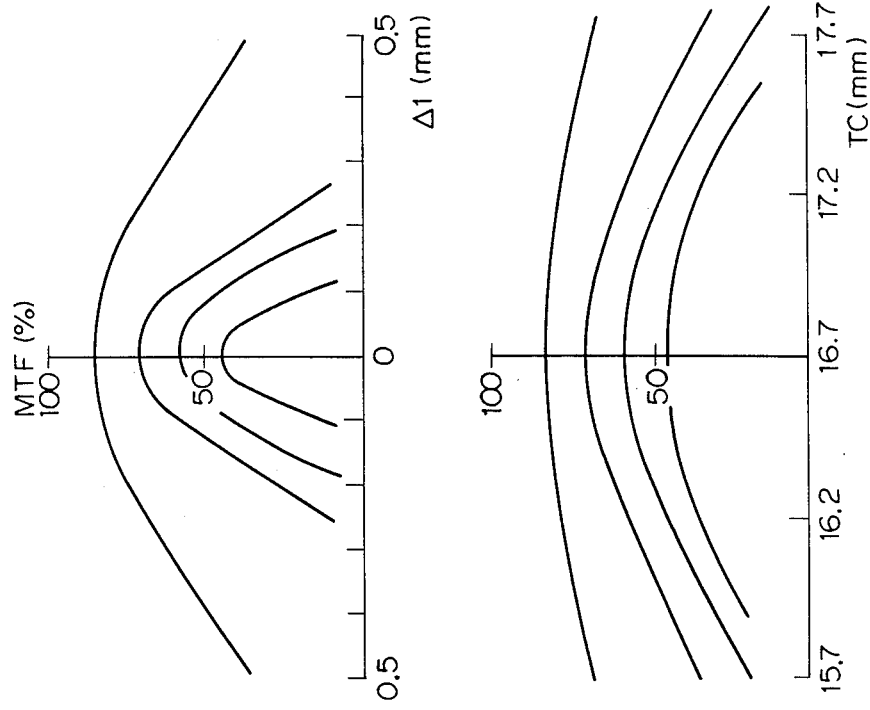
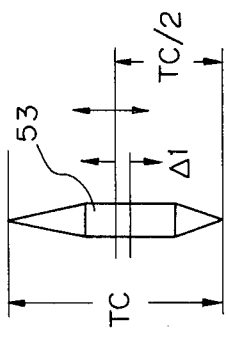
Fig. 13(B)
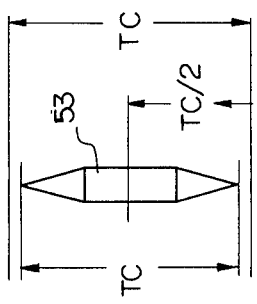
Fig. 13(C)

IMAGE SENSOR UNIT AND IMAGE READING APPARATUS HAVING THE UNIT

BACKGROUND OF THE INVENTION

1. Field of the Invention

The present invention relates to an image sensor unit and an image reading apparatus having the unit and, more particularly, to a so-called contact image sensor unit and an image reading apparatus having the unit, the unit being adapted to read an image formed on an original surface such that light is emitted from a light source to the original surface and light reflected by the original surface is received.

2. Related Background Art

A conventional image reading apparatus of this type comprises a fluorescent lamp as a light source. Light emitted from the fluorescent lamp is reflected by an original surface, and reflected light is guided to a lens through a reflecting optical system such as a reflecting mirror or the like. A reduced image is then formed on a photoelectric transducer element such as a CCD.

In recent year, an image reading apparatus having a light-receiving element of the same size as the original reading width is proposed instead of using a reducing optical system including a reflecting mirror and a lens. In this image reading apparatus, image information of the original is read in an equal-size mode, i.e., a magnification of 1. When such a light-receiving element is used, a light quantity (illuminance) for illuminating the original is about 1/10 that in a case using a reducing optical system. In addition, the light-receiving element can be disposed near the original surface. Therefore, a compact illumination light source can be obtained. In the conventional image reading apparatus having such a light-receiving element, a small-diameter fluorescent lamp or an LED array obtained by aligning LED chips on an aluminum, glass, or epoxy board is frequently used as an illuminating means.

The conventional image reading apparatus of this type comprises a light source for illuminating an original, an equal-size lens for focusing light reflected by the original to a sensor light-receiving surface, and a photoelectric sensor.

FIG. 1 shows concept of a conventional contact image sensor (to be referred to as a CS hereinafter). Referring to FIG. 1, an original 41 is fed in a direction indicated by arrow A. An LED aray 42 has an illumination length corresponding to the width of the original sheet in a direction perpendicular to the drawing surface. A lens array 43 is perpendicular to the surface of the original 41. An image sensor 44 is parallel to the original 41 to read image information through the lens array 43.

FIG. 2 is a sectional view showing another conventional image reading apparatus. An original 51 is fed in a direction indicated by arrow A. LED chips 52a are bonded on a board 52b such as an aluminum, glass, or epoxy board. A rod lens 52c extends in a direction perpendicular to the drawing surface and accommodated in a lens housing 52d. The rod lens 52c focuses light emitted from the LED chips 52a to form a linear beam on the surface of the original 51. A lens array 53 is perpendicular to the surface of the original 51 and a sensor 54 is parallel thereto and separated therefrom by a distance TC, so that light reflected by the original surface is incident on the sensor 54 through the lens array 53. A CS frame 55 comprises an aluminum extruded member having an excellent heat dissipation property. An original guide 56 is designed to clamp the original 51 with a platen roller 58 adapted to rotate in a direction of arrow B. The lens array 53 is biased in directions of arrows C and D by a leaf spring 57.

FIG. 3 is a perspective view showing the main part of the conventional image reading apparatus shown in FIG. 2.

Side plates 59a and 59b are fixed on the short side surfaces of the CS frame 55. Adjusting screws 60A (only one is illustrated) are threadably engaged with the lower portions of the lens array 53 to finely adjust the positions of the lens array 53 in a direction indicated by arrow E. As described above, the lens array 53 is biased downward by the leaf spring 57. Therefore, the adjusting screws 60A are also biased downward by the leaf spring 57.

The original reading operation of the arrangement described above will be described below.

Light from the LED chips 52a is focused by the rod lens 52c to illuminate the image information surface of the original 51 at an image reading position. Light reflected by the original 51 is focused on the light-receiving surface of the sensor 54 through the lens array 53. The sensor 54 converts light information into an electrical signal, thereby reading the image information. The CS output characteristics associated with general mounting of components will be described. In order to obtain a uniform CS output with a high MTF (Modulation Transfer Function), the following conditions are required:

1. Uniform illumination at the reading position (line); and

2. Precise focusing of the original image information with a high MTF.

In order to satisfy the above conditions, precise components must be used to result in an expensive CS.

The high-precision parts will be described below.

Referring to FIG. 2, the LED chips 52a are fixed with respect to a surface F. The LED chips a are mounted on the board 52b and the board 52b is fixed on the surface F by screws, thus determining the mounting precision of the components.

The light quantity distribution of illumination by the LED array will be described below. FIG. 4(A) is a view of an LED array.

FIG. 4(B) a three-dimensional light quantity distribution on a plane parallel to the surface of the Al board of the LED. The X-axis is the longitudinal direction of the LED array (i.e., the read line position), the Y-axis is perpendicular to the X-axis and parallel to the Al board 52b, and I represents the light quantity at each point on the X-Y plane. A broken curve 91 represents an illuminance distribution curve on a plane perpendicular to the X-axis.

As is apparent from FIG. 4(B), the light quantity is maximum if Y =0. The LED chips are mounted on the board 52b at a pitch of several mm in the X direction, and thus the light quantity distribution generally has a wave-like ripple.

FIGS. 5(A) and 5(B) are sectional views along a plane perpendicular to the X-axis of FIG. 4(A). Component mounting precision causing a nonuniform light quantity distribution of the LED will be described below.

FIG. 5(A) shows a state wherein the center of the lens 52c is deviated by Δ1 from the ideal position. In this state, the focusing position is deviated by Δ2 from a position 53a to a position 53b.

FIG. 5(B) shows a state wherein a deviation of the position of the LED chip 52a from the ideal position by Δ3 causes a deviation of Δ4 in focusing position.

FIG. 6 is a graph showing a change in illuminance at the reading position when the focusing position is deviated by Δ2 from the ideal position.

Referring to FIG. 6, an illuminance distribution curve 91 is obtained for an ideal plane perpendicular to the X-axis, as shown in FIG. 4(B), and an illuminance distribution curve 92 is obtained for a plane deviated from the ideal plane by Δ2, as shown in FIG. 5(A). In general, the LED array illuminance is about 1,000 lx. When a deviation occurs, as shown in FIG. 5(A), the illuminance at the reading position is decreased to $I_2/I_1 \times 100$ (%). Such degradation is caused by an abrupt increase in illuminance near the optical axis of the illumination system, as shown in FIG. 6, since focusing precision is improved by the lens and an illuminance peak value is increased. An output with 90% $I_1$ is a normal limit which allows formation of a line with a width of 1 mm in the Y direction.

In order to assure a uniform illuminance on the original surface, precision in the following items must be improved.

(1) Lens position (FIG. 5(A))
(2) LED chip position (FIG. 5(B))
(3) Distance $H_1$ between the lens and the chip
(4) Distance $H_2$ between the chip and the original
(5) Mounting position of the LED Al board (position relative to the reading position)

Items (1) and (2) have been described above. A case will be described wherein end LEDs are deviated from the ideal positions and the inner or intermediate LEDs are linearly aligned. As for item (2), the LED chips are generally bonded by a robot and bondin precision is given as about 50 μm. Therefore, the deviation Δ4 in FIG. 5(B) is given as about 0.1 to 0.2 mm.

As for item (1), the deviation Δ1 in FIG. 5(A) is generally about 0.3 mm, and the deviation Δ2 is about ±1 to ±2 mm accordingly.

As for items (3) and (4), maximum precision is about ±0.2 mm. This deviation causes light quantity variations of about ±15%

As for item (5), maximum precision is determined by mounting precision of the Al board 52b on the surface F shown in FIG. 2 and is thus about ±0.2 mm.

The illuminance curve on the original reading position line is inclined due to the above reasons, as indicated by the alternate long and two or three short dashed line in FIG. 12. If the illuminance at the reading position is not uniform, the output distribution of the sensor is also inclined to cause contamination of a sheet having a read image and degradation of a resolution of a halftone image.

In order to solve the above problems, the following countermeasures are taken:

(1) The lens is rotated or the lens fixing position is adjusted;
(2) The LED Al board is finely adjusted to achieve precise positioning; and
(3) Precision of the components is improved and a proper combination of the components is determined to obtain uniformity.

The above countermeasures result in a complicated apparatus and the number of assembly steps is increased, thus causing high cost. In particular, a technique for adjusting the positions of all LEDs requires a large number of adjusting steps while the operator must check the two-dimensional illuminance distribution.

FIGS. 7 to 10 are views for explaining the lens array (to be referred to as an SLA hereinafter).

FIG. 7 shows a structure of the SLA 53 wherein two rows of rod lenses 61 are staggered from each other. The rod lenses 61 are sandwiched between side plates 63 and a resin 62 is filled in spaces between the rod lenses 61.

FIG. 8 shows a focusing state of the SLA. In this state, light beams from the rod lenses 61 are focused to obtain an erected image of an equal size. An original surface, an image plane and an illuminance distributions are represented by numerals 64, 65, and 66, respectively.

FIG. 9 is a view showing an illuminance distribution at an image plane when uniformly scattered light is incident on the SLA. The lenses 61 have inverted U-shaped distributions 66 whose peaks are on the axes of the corresponding lenses. An illuminance distribution is obtained by superposing a plurality of inverted U-shaped distributions on the image plane.

FIG. 10 is a three-dimensional representation of the above phenomenon.

FIG. 11 shows an illuminance distribution on the X-direction line when the focal point is deviated by Δy from the optical axis on the focusing side. As is apparent from FIG. 11, ripple components caused by individual rod lenses are present.

If the uniform illuminance line on the original surface, the line of the light-receiving surface of the sensor, and the line of the SLA are deviated from each other, the illuminance distribution curve on the sensor sxrface is inclined, as indicated by the alternate long and two or three short dashed lines in FIG. 12. Resolution degradation depending on LSA positions will be described below.

FIGS. 13(A), 13(B), and 13(C) show relationships between the SLA position and the MTF with respect to the object surface and the image plane. Four lines in the right graph represent MTFs when 2-, 4-, 6-, and 8-LP/mm charts are read, respectively. Referring to FIGS. 13(A), 13(B) and 13(C), if the upper surface of the TC is defined as the original position and the lower surface of the TC is defined as the sensor position, a maximum MTF can be obtained when the SLA is positioned at the center of the TC.

FIG. 13(A) shows a change in MTF when the sensor and the SLA are fixed and the position of the original is changed FIG. 13(B) shows a change in MTF, depending on the position of the SLA, when the distance between the original and the sensor is predetermined.

FIG. 13(C) shows a change in MTF, depending on the distance of the original and the sensor, when the SLA is fixed. In particular, the SLA is always located at the center (i.e., TC/2) of the original sensor.

Since the SLA and the sensor are integrally supported as a sensor unit, the TC/2 is frequently predetermined. The TC is mechanically measured by bringing the sensor unit into contact with a backup roller for the original.

The following facts can be derived from the above description.

FIG. 13(A) shows an allowance of variations in original feeding. FIG. 13(B) shows positional precision required for the SLA in the sensor unit. FIG. 13(C) shows allowance of the distance between the backup roller and the sensor position of the sensor unit.

As is apparent from FIG. 13(B), when the SLA position is deviated from the center (TC/2 position) with respect to the overall optical path length TC, the MTF is greatly degraded In order to solve the above problem, the SLA is brought into contact with a surface G in FIG. 2, and the sensor is fixed on the frame 55 with high precision. In this manner, in general, positional precision of the components is improved by satisfying parallelism thereof. However, these high-precision components are expensive to result in an expensive CS. As a result, an inexpensive CS unit cannot be provided.

In a conventional apparatus using an LED array, when the LED array is mounted on a structure of the housing or a structure for the illumination unit in the apparatus, set screws are generally threadably engaged with screw holes formed in the structure through fixing holes formed in the aluminum, glass or epoxy board. However, the following problems occur.

In the conventional LED array, in order to obtain a light quantity required for a light-receiving element (to be referred to as a sensor hereinafter) having a magnification of 1, power consumption of each LED chip is several 100 mW. When several tens of LED chips are arranged, total power consumption of the LED array is several W. Therefore, an energy component which is not converted into an electrical signal is dissipated as heat, and the portion around the LED array is heated to a relatively high temperature. For this reason, if a structure does not have substantially the same linear heat expansion coefficient as that of the aluminum, glass, or epoxy board mounted on the structure, a difference between the heat expansion coefficients of the LED array board and the structure undesirably causes a so-called bimetal effect. The LED array is warped or the structure is deformed.

In particular, the rod lenses made of glass or an acrylic material are arranged between the LED chips and the original illumination position, and light beams from the LED chips are focused by the lenses on the original surface. The illuminance distribution on the original surface is greatly degraded depending on a change in positional relationship between the LED chips and the lenses. Therefore, when the bimetal effect occurs, the distances between the LED chips and the corresponding lenses become different to change the illuminance distribution along the longitudinal direction of the LED array. In a conventional image reading apparatus, stable image reading cannot be performed.

In a conventional CS of this type, the length of the sensor array is substantially equal to the original reading width so as to read the image information from the original in an equal size. In order to reduce the total cost of the sensor, the sensor comprises a thin flat plate made of glass or the like, and light is transmitted through the thin flat plate. Input/output signal lines of the sensor are formed as a pattern according to thin-film deposition or the like. The dimensions of the pattern are determined as follows The width of the pattern is about 1 mm and the pitch thereof is about 2 mm.

Moreover, a sensor driver is generally formed on another printed circuit board. Connections between the driver and the input/output signal line pattern of the sensor board are performed using an interconnector since it is difficult to perform such connections through a connector soldered to the pattern or direct soldering of the wires to the pattern and the driver. The interconnector is used for electrical connections between a liquid crystal panel and a printed circuit board separate from the panel in, e.g., an electronic calculator. The interconnector is a rectangular or cylindrical connecting member wherein a conductor portion of wires smaller than the line width and the pitch of the wiring pattern is covered with an elastic member.

When such an interconnector is used, a pattern having a line width and a pitch, both of which correspond to those of the pattern on the sensor, is formed on the opposite surface of the printed circuit board for the driver. Therefore, the interconnector can be clamped between the sensor board and the driver board.

However, in a conventional connection structure using the interconnector, the input/output lines are short-circuited or cannot be electrically connected at the time of image pickup operations unless the input-/output signal line pattern of the sensor board is completely matched with the pattern on the driver board. As a result, alignment requires cumbersome operations and high cost at the time of apparatus assembly.

In addition, these boards must be fixed while perfect alignment is maintained. According to conventional assembly, the sensor is held urged by a leaf spring or the like against the structure of the image sensor unit, and the interconnector and the driver board are then fixed thereon. Working efficiency of the assembly is degraded, and the number of assembly steps is undesirably increased.

Since the level of a signal from the image sensor is generally very low, the contact area per wiring pattern must be increased at the electrical connections. Assuming that one pattern is about 4 to 5 mm on the average, if the interconnector mounted on the board is inclined, it may be short-circuited to the adjacent patterns.

In order to assure the electrical connections using the interconnector, a ratio of the height before mounting to that after mounting is 135:100. When the interconnector is mounted on the board while being pressed, the sensor and driver boards are warped by a reaction force, thereby inclining the boards relative to each other, thus causing defocusing or wiring pattern disconnections.

SUMMARY OF THE INVENTION

It is an object of the present invention to solve the conventional problems and to provide an expensive image sensor unit and an image reading apparatus having the unit, wherein accurate adjustment can be performed by a simple method.

It is another object of the present invention to solve the conventional problems described above and to provide an image sensor unit and an image reading apparatus having the unit, wherein a mounting state of an illuminating means such as an LED array can be stabilized, the illuminance distribution can be uniform, and high-quality reading can be performed.

It is still another object of the present invention to solve the conventional problems and to provide an image sesor unit and an image reading apparatus having the unit, wherein workability can be improved, the number of assembly steps can be reduced, and firm electrical connections between the separate boards or substrates can be assured.

It is still another object of the present invention to provide an image sensor unit and an image reading apparatus having the unit, wherein an original can be read at an optimal position by eliminating the influence of SLA ripples, and overall adjustment of the CS unit can be achieved only by positioning of the sensor and alignment (focusing) of the SLA.

It is still another object of the present invention to provide an image sensor unit and an image reading apparatus having the unit, wherein even if an illuminating means and a holding member are thermally expanded upon heating of the illuminating means, a mounting member can absorb the deformation of the holding member or the like to eliminate a bimetal effect of the holding portion and prevent the illuminating means and the holding member from being warped, and a nonuniform illuminance distribution on the original surface can be prevented and the range of material selection for the respective members can be widened.

It is still another object of the present invention to provide an inexpensive, highly reliable image sensor unit and an image reading apparatus having the unit, wherein a sensor board is accurately positioned by a mounting support plate, an electrical connecting member can be accurately positioned when the sensor board is clamped between the mounting support plate and a sensor driver circuit board, these boards are fixed while the driver board is engaged with the mounting support plate, and their engaging and fixing portions are constituted to surround the position of the electrical connecting member so that the electrical connecting member can be properly urged against the pattern electrode on the sensor board, thereby preventing the boards from warping and reducing the number of assembly steps.

It is still another object of the present invention to provide an inexpensive, highly reliable image sensor unit and an image reading apparatus having the unit, wherein an electrical connecting member and a sensor board which are sandwiched between the driver board and the sensor board when the sensor board is clamped between the driver board and the mounting support plate, the boards are threadably engaged with the support plate by screws to finish assembly of the image sensor, and the number of assembly steps can be greatly reduced as compared with the conventional assembly operation.

It is still another object to provide an image sensor unit comprising:

illumination means for illuminating light on an original;

an image sensor for reading out image information on the original by reflection light of said illuminated light;

holding means for holding said illumination means; and a mounting means for causing said holding means to hold said illumination means so that the relative displacement between said illumination means and said holding means in a direction along a surface of said holding means on which said illumination means is held by said holding means.

It is still another object to provide a sensor unit comprising:

a sensor substrate having a light receiving element array having a plurality of light receiving elements; and a circuit substrate and supporting plate for said light receiving elements:

said sensor substrate being supported on said supporting plate by said circuit substrate through a connection member having an elastic characteristic and used for performing electrical connection between said sensor substrate and said circuit substrate.

It is still another object to provide an image sensor unit comprising:

a sensor substrate having a light receiving elements array having a plurality of light receiving elements;

an optical system unit for guiding an image information received in said light receiving elements;

a supporting plate attached on said optical system unit; and a circuit substrate for said light receiving elements, said sensor substrate being supported on said supporting plate by said circuit substrate through a connection member having an elastic characteristic and used for performing electrical connection between said sensor substrate and said circuit substrate, and said circuit substrate and said supporting plate being bonded each other by a engaging portion and fixing portion arranged on at least three areas.

It is still another object to provide an a sensor unit comprising:

a sensor substrate having a light receiving element array;

an electrically insulating protection plate having a hole corresponding to a pattern electrode on said sensor substrate;

a circuit substrate for said light receiving element array;

a connection member having an elastic characteristics for performing the electrical connection between said sensor substrate and said circuit substrate; and a supporting plate for supporting said circuit substrate and said sensor substrate, said protection plate and said connection plate being inserted between said sensor substrate and said circuit substrate such that said connection member is arranged so as to correspond to the hole of said protection plate, and said sensor substrate and said circuit substrate being supported by said supporting plate.

It is still another object to provide an image sensor unit comprising:

illumination means for illuminating an image information surface of an original;

imaging means for imaging the reflection light of from the original by said illumination means at real size;

a light receiving element provided on the imaging plane of said reflection light, for photoelectric converting the reflection light to read out image information;

a structure for integrally holding said illumination means and said imaging means; and means for integrally bonding said light receiving element and a driving circuit for said light receiving element, said illumination means and said imaging means being separated from said light receiving element, said unit having a structure divided with respect to a surface perpendicular to an optical axis of said imaging means, the position of light receiving line of said light receiving element being adjustable on a surface perpendicular to said optical axis, and said illumination means, said imaging means, and said light receiving element being binded one another thereby to form an unit structure.

It is still another object of the present invention to provide an image sensor unit and an image reading apparatus having the unit, wherein an interconnector is fitted in a fitting hole (having a pattern corresponding to a pattern electrode) formed in an insulating protective plate disposed on the side of the pattern electrode and light-receiving element array on a sensor board, and a light-receiving element driver board is placed on the above assembly while the state of the assembly is maintained, so that the driver board can be aligned with the sensor board using the engaging relationship between the sensor board and the support plate, thereby assuring highly reliable electrical connections between the sensor and driver boards.

BRIEF DESCRIPTION OF THE DRAWINGS

FIG. 3 is a perspective view of the CS unit shown in FIG. 2;

FIGS. 13(A), 13(B), and 13(C) are views for explaining the relationships between the SLA positions and the resolutions, respectively;

DETAILED DESCRIPTION OF THE PREFERRED EMBODIMENTS

Preferred embodiments of the present invention will be described with reference to the accompanying drawings.

Figure 14:
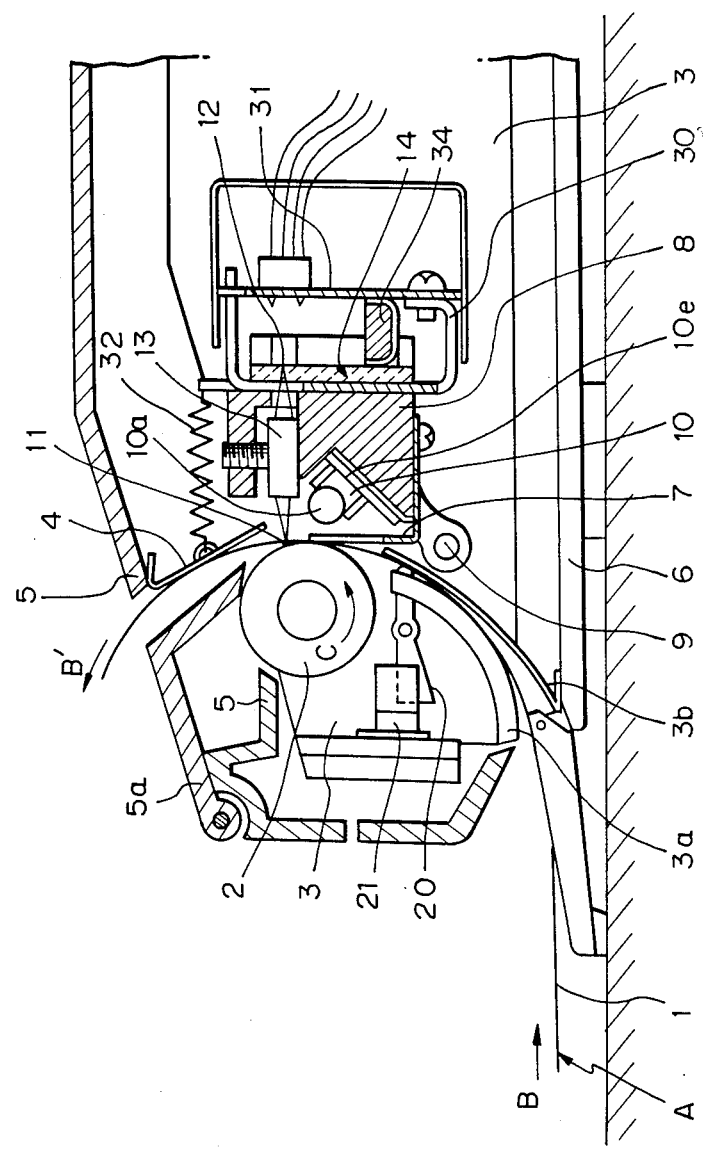
FIG. 14 is a sectional view of a reading apparatus incorporating the sensor unit according to an embodiment of the present invention.

FIG. 14 is a sectional view showing a first embodiment of the present invention. The first embodiment exemplifies an original reading apparatus for causing a drive roller to guide an original from a lower position to a reading position and transporting the original from the reading position to an upper position. The reading apparatus comprises a sensor for forming an image of an equal size as a light-receiving element.

Referring to FIG. 14, an original 1 has image information on the A side. A drive roller 2 feeds the original 1 in a direction of arrow B and is driven by a drive source (not shown). When the drive roller 2 is rotated in a direction of arrow C, image information of the original 1 can be read. The reading apparatus comprises a structure frame 3, and a pair of guides 3a and 3b (a guide mechanism) for guiding the original 1 to the roller 2. The guide 3a serves as an upper guide, and the guide 3b serves as a lower guide. A discharge guide (a guide plate) 4 guides the original 1 outside the apparatus. An upper cover 5 is disposed on the upper portion of the apparatus. A cover 5a is disposed in a discharge portion and pivotal in the direction of arrow C. The cover 5a also serves as a guide in the discharge portion. A bottom cover 6 covers the bottom portion of the apparatus. A press guide 7 is pressed by a pressing means (to be described later) to clamp the original 1 with the roller 2 and to provide a feed force thereto. An illuminating means (to be described later), an equal-size lens means (to be described later), the sensor, and the like are mounted on a structure (to be referred to as a holder hereinafter) 8 for a reading unit. The holder 8 is then fixed on the apparatus housing. The holder 8 is made of an aluminum pultruded material, an aluminum die cast material, or a resin material. The holder 8 has a central hole as the center 9 of rotation. The holder 8 is pivotal about the center 9 with respect to the housing.

An illuminating means 10 is mounted in the holder 8. An original reading position 11 is defined as an intersection of a focused line beam and the surface of the roller 2, and a light-receiving line 12 is defined on the light-receiving element. An equal-size lens 13 guides light reflected by the original reading position to the light-receiving position 12 of the photoelectric light-receiving portion. A sensor 14 has the photoelectric light-receiving portion at the light-receiving position 12 and is mounted on a mounting plate 30.

An actuator 20 is rotated in synchronism with insertion of the original 1. Rotation of the actuator is detected by a detector 21.

A driver for driving the sensor 14 is mounted on a circuit board 31, and the circuit board 31 is electrically connected to a system controller (not shown). The circuit board 31 is designed to drive the sensor 14 in response to an input signal from the system controller, process the optical output signals from the sensor 14, and send the processed signal to the system controller. A pressing means 32 presses the reading unit toward the roller 2. A connector 34 connects the sensor 14 to the driver on the circuit board 31.

In the original image reading apparatus having the arrangement described above, when the roller 2 is rotated in the direction of arrow C, the original 1 is fed from the direction of arrow B to a direction of arrow B'. Image information on the A side of the original 1 is formed on the light-receiving portion of the sensor 14 through the lens 13 after light from LED chips 10e is focused by the rod lens 10a and incident on the A side. Therefore, the image information is photoelectrically converted by the sensor 14 and can be read thereby.

Figure 15:
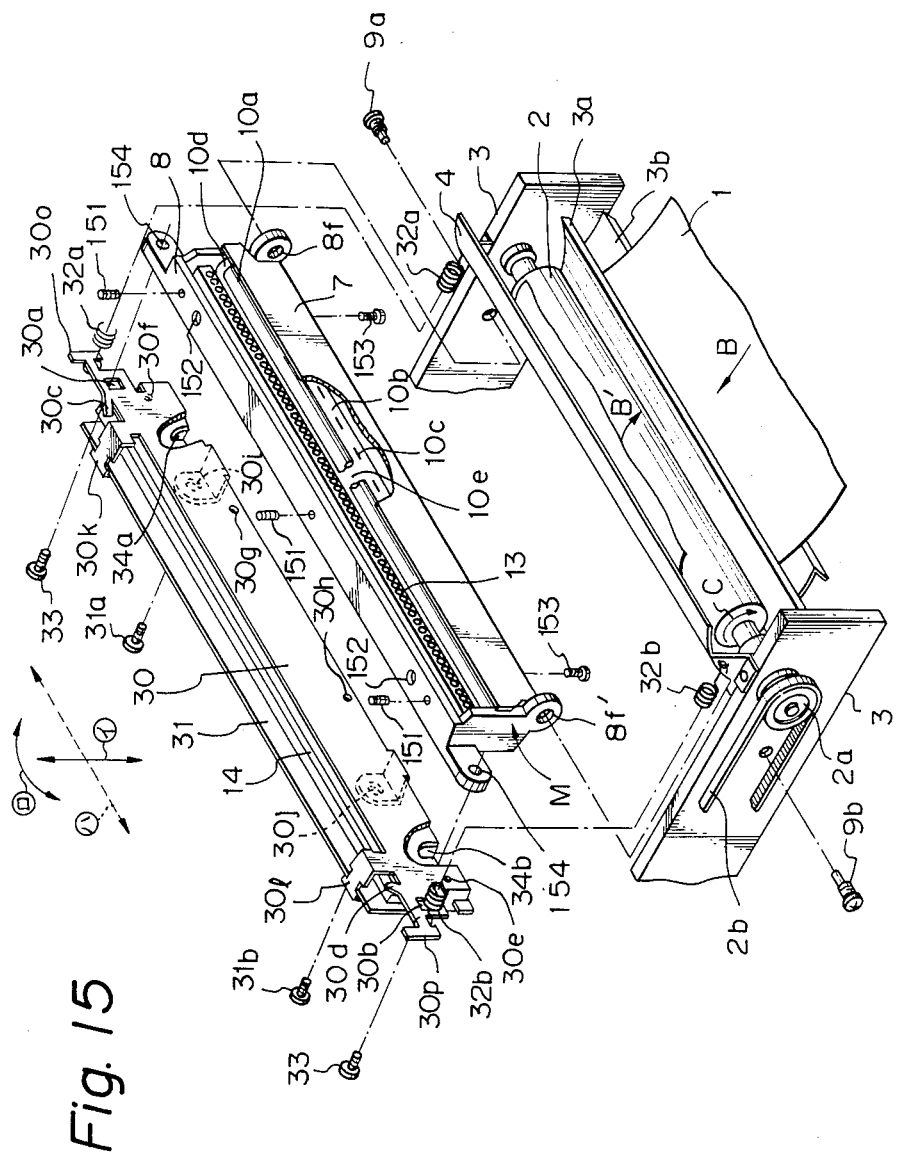
FIG. 15 is a perspective view of the reading apparatus incorporating the sensor unit.
Figure 16:
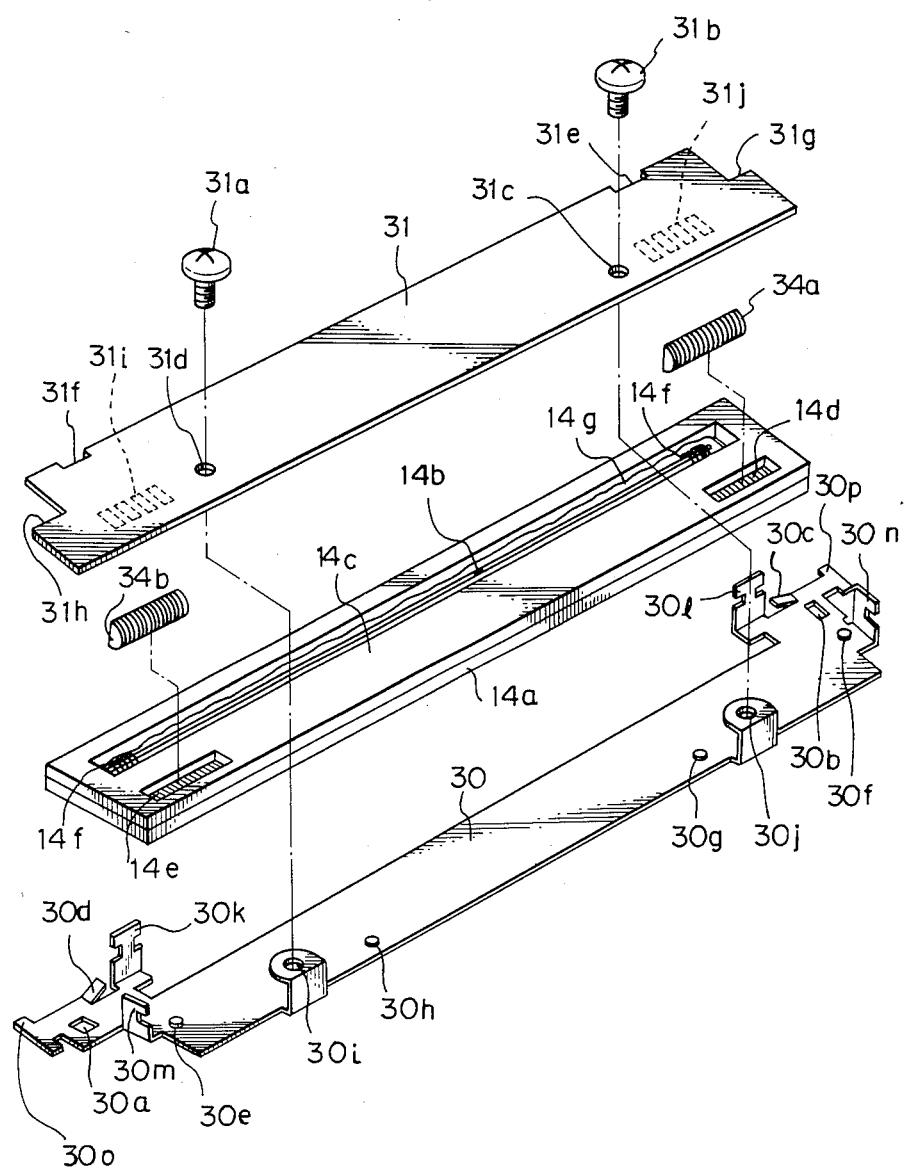
FIG. 16 is a perspective view showing part of the CS unit of the reading apparatus.

FIG. 15 is a perspective view showing the detailed arrangement of the reading unit shown in FIG. 14, and FIG. 16 is a perspective view showing part of the CS unit.

The original 1 is inserted in the direction of arrow B and is returned and discharged in the direction of arrow B'. The arrangements which have not been described with reference to FIG. 14 will be described in detail. The same reference numerals as in FIG. 14 denote the same parts in FIG. 15.

A pulley 2a is mounted on one side of the roller 2, and a belt 2b transmits a driving force from a drive system (not shown) to the roller 2 through the pulley 2a. The press guide 7 is fixed to the holder 8 by set screws 153. The lens 13 is fixed to the holder 8 by screws 151 from a direction perpendicular to the optical axis of the focusing lens 13. Holes 152 are formed in the holder 8 so that the side surface of the lens 13 is accessible from the above in FIG. 15. Needle-like projections of a jig (not shown) are inserted in the holes 152 to adjust the axial position of the lens 13. Holes 8f and 8f' are formed in the side surfaces of the holder 8 to pivotally support the holder 8. The hole 8f is a circular hole, and the hole 8f' is an elongated hole.

Taps 154 are formed at both ends of the holder 8 and are used to fix the sensor mounting plate 30 described with reference to FIG. 14.

Stepped screws 9a and 9b are threadably engaged with the taps formed in the frame 3 such that the distal pin portions of the screws 9a and 9b are respectively inserted in the holes 8f and 8f' formed in the holder 8. The holder 8 is pivotal about the pins in a direction of arrow M.

The illuminating means 10 comprises the square LED chips 10e bonded on a board 10b, a rod lens 10a for focusing light beams from the chips 10e to illuminate an original located at the reading position 11, a lens housing 10d for covering the both sides of the lens array to fix the rod lens 10a to the LED board 10b, and a resistor 10c soldered on the LED board to limit the currents supplied to the LED chips 10e.

The sensor mounting plate 30 has holes 30a and 30b for receiving screws 33 for fixing the holder 8. The size of each hole 30a or 30b is larger than the diameter of the corresponding screw so that the position of the mounting plate 30 can be adjusted relative to the holder 8. L-shaped portions 30c and 30d abut against the glass end faces of the sensor 14 to align the sensor 14 in position. Embossed portions 30e, 30f, 30g, and 30h abut against the glass end face of the sensor 14. Tapped fixing surfaces 30i and 30j fix the driver circuit board (to be referred to as a PCB hereinafter) 31. Holding pawls 30k, 30l, 30m, and 30n are designed to prevent floating of the PCB 31. Spring pawls 30o and 30p serve as the pressing means. The PCB 31 is fixed to the mounting plate 30 by screws 31a and 31b. Pressing means 32a and 32b are located at both ends of the mounting plate 30. Press connectors 34a and 34b are coupled to the sensor and the PCB.

Referring to FIG. 16, the sensor 14 comprises a glass plate as a base 14a. A pattern is deposited on the upper surface of the base 14a. Sensor chips 14b obtained by cutting a wafer constitute a sensor portion. The sensor portion is fixed in the glass base 14a by a transparent adhesive. A molding frame 14c made of silicone rubber or the like performs alignment of the connectors 34a and 34b and prevents a molding material (silicone rubber) from flowing out from the frame 14c. Gold-plated patterns 14d and 14e are formed on the glass base 14a. Recesses are formed in the portions of the molding frame 14c above the patterns 14d and 14e. The connectors 34a and 34b are fitted and aligned in the recesses. Bonding wires 14f are used to bond the sensor chips 14b and the patterns of the glass base 14a. An elastic member 14g such as silicone rubber covers the sensor chips 14b to protect the bonding wires.

The screws 31a and 31b are respectively fitted in the circular and elongated holes 31c and 31d to align the PCB 31 in position. The mounting plate 30 is fixed to the PCB 31 through the sensor 14 by the screws 31a and 31b in the structure shown in FIG. 16. However, alignment may be performed using other edge portions and the pawls of the mounting plate, and the screws and screw holes need not be used for alignment. Notches 31e and 31f are engaged with the portions 30e and 30k of the mounting plate 30 to prevent the PCB 31 from floating. Notches 31g and 31h are engaged with pawls 30n and 30m to prevent the PCB from floating in the same manner as in the notches 31e and 31f.

Two screws and one pawl are used for each connector, so that floating of the connector is prevented in three directions, thereby assuring coupling of the connectors.

Patterns 31i and 31j are formed on the lower surface of the PCB 31 at positions corresponding to the patterns 14e and 14d of the sensor 14. When the PCB 31 is fixed to the mounting plate 30 through the connectors, the PCB 31 is electrically connected to the sensor 14.

In this embodiment, when the SLA is to be built into the sensor unit to fix the SLA, the position of the SLA is adjusted to the TC/2 position wwhere a maximum MTF is obtained. In this embodiment, since the guide plate 7 is aligned (threadable fitting) with the holder 8, the guide plate 7 is finely adjusted with respect to the holder 8 and is fixed thereto.

As described above, the illuminating means and the focusing means in an CS (contact image sensor) are integrally formed, and the CS body can be separated such that the sensor and the driver are integrally formed. When the above structures are coupled to each other, fine adjustment of a coupling position is performed in a direction indicated by arrow ∧ in FIG. 15. At the same time, fine adjustment of the coupling position in the rotational direction indicated by arrow ▭ is possible. Therefore, the following effects can be obtained.

Figure 12:
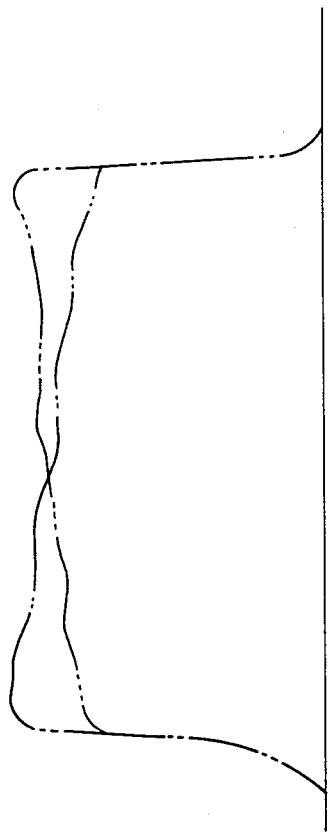
FIG. 12 is a view for explaining a sensor output curve inclined according to an inclined light quantity distribution of the LED sensor unit.
Figure 13A:
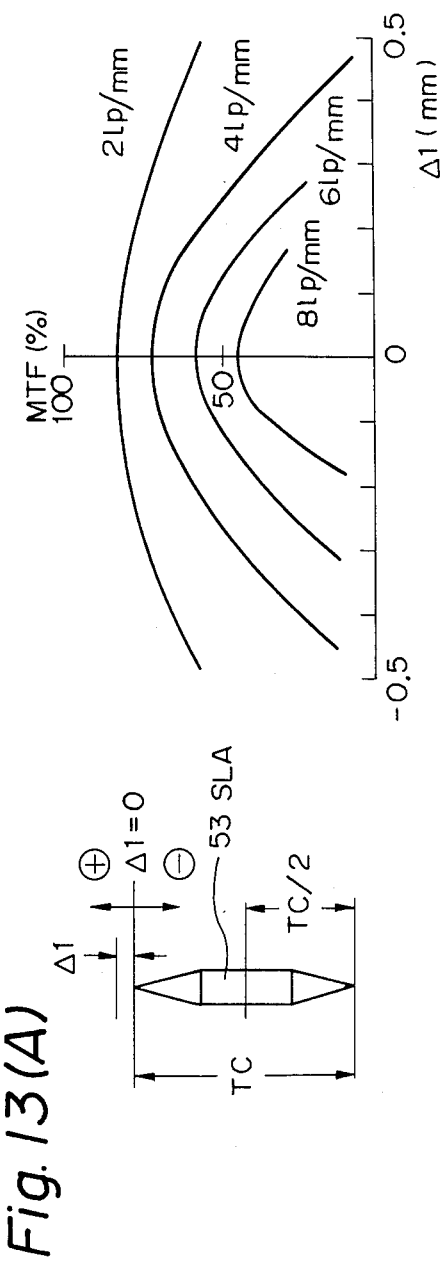
Figure 17:
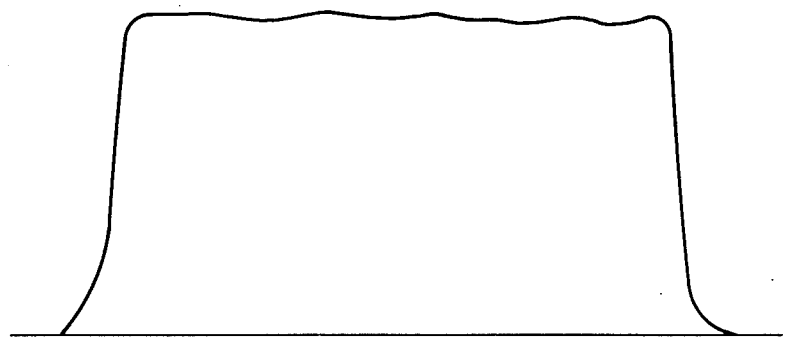
FIGS. 17 and 18 are views showing sensor outputs, respectively.

(1) If the adjustment of the illumination light source is not performed as described with the conventional case, the illuminance distribution of the original surface is given by the alternate and two or three short dashed line in FIG. 12. If the sensor reads a reading position line, the output waveform of the sensor is similar to that shown in FIG. 12. When the light-receiving portion is rotated in the direction indicated by arrow ▭ in FIG. 15, the sensor output waveform can be flat, as shown in FIG. 17.

(2) As described with reference to the SLA, the light quantity distribution of light transmitted and focused through the SLA is given as shown in FIG.

10. In particular, if the illuminance distribution on the original surface is uniformly scattered, the sensor output equivalent to the transmitted light quantity distribution is given as shown in FIG. 18.

A high output (curve A) with ripple components is obtained on the optical axis of the SLA.

Figure 18:
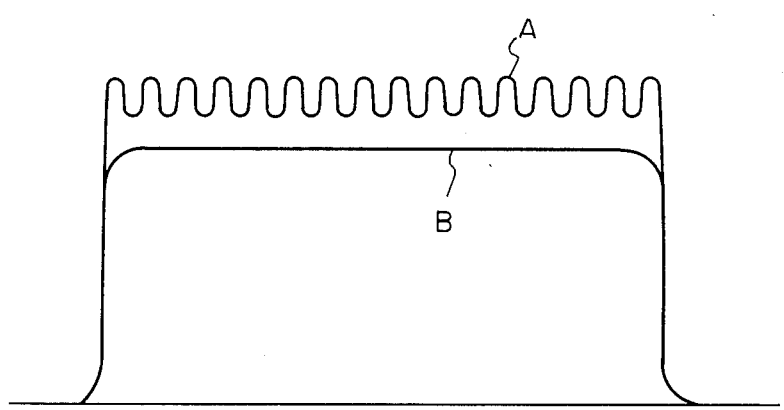

As shown in FIG. 15, when the position of the sensor is moved in the direction of arrow Λ relative to the SLA, the sensor output becomes slightly lower than the maximum output, as indicated by a curve B in FIG. 18. However, the SLA waveform can be made flat with a small number of ripple components.

(3) The independent results of the illuminating means and the focusing means have been described in items (1) and (2). However, the sensor line is adjusted under the condition that the illuminating means and the focusing means are integrally formed. The illuminating means and the focusing means allow production of the maximum output for the composite focused light quantity distribution on the sensor surface as well as flat output characteristics. Therefore, the effects described in items (1) and (2) can be obtained by a single adjustment cycle.

(4) By moving the sensor in a direction indicated by arrow Λ in FIG. 15, the reading start position of the sensor, i.e., the positional relationship between the reading width and the original width in the original widthwise direction (i.e., the main scanning direction), can be accurately adjusted.

Figure 19:
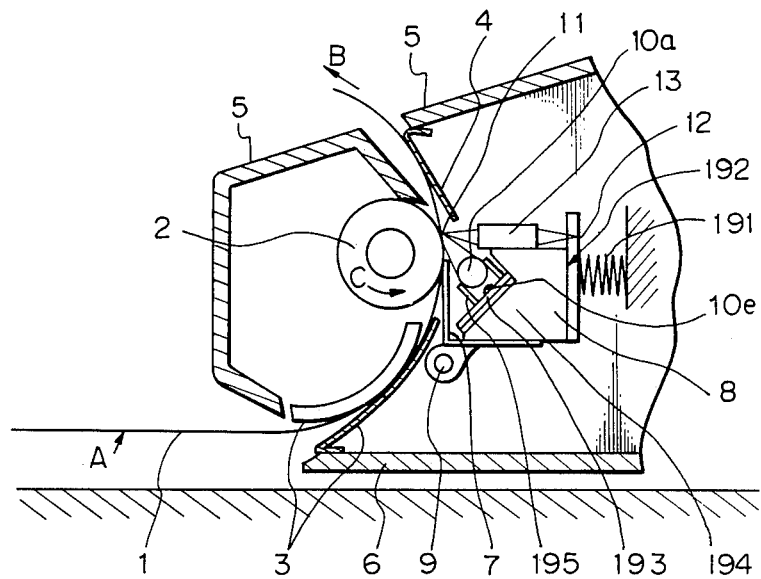
FIG. 19 is a sectional view of a reading apparatus according to another embodiment of the present invention.

FIG. 19 shows a second embodiment of the present invention. This embodiment exemplifies an image reading apparatus wherein a sheet material (original) having an image threon is turned from the lower left side to the upper left side and image information is read by a sensor at the turning point at a magnification of 1.

Referring to FIG. 19, an original 1 has image information on the A side. A drive roller 2 feeds the original 1 in a direction of arrow B and is driven by a drive source (not shown). When the drive roller 2 is rotated in a direction of arrow C, image information of the original 1 can be read. The reading apparatus comprises a structure frame, and a pair of guides 3 separated from each other to form a gap for guiding the original 1. Each guide has a predetermined radius of curvature for turning the original 1 with the corresponding curvature. A discharge guide 4 guides the original 1 outside the apparatus. An upper cover 5 is disposed on the upper portion of the apparatus. A bottom cover 6 covers the bottom portion of the apparatus.

A press guide 7 is pressed by a pressing means (to be described later) to clamp the original 1 with the roller 2 and to provide a feed force thereto. An illuminating means (to be described later), an equal-size lens means (to be described later), the sensor, and the like are mounted on a structure (to be referred to as a holding member or holder hereinafter) 8 for a reading unit. The holder 8 is then fixed on the apparatus housing. The holder 8 is made of an aluminum pultruded material, an aluminum die cast material, or a resin material. The holder 8 has a pivot shaft 9. The holder 8 is pivotal about the shaft 9 with respect to the housing. A spring member 19 as a biasing means is arranged to bias the reading unit against the roller 2.

An original reading position 11 is defined as an intersection of a focused line beam and the surface of the roller 2, and a light-receiving line 12 is defined on the light-receiving element. An equal-size lens 13 guides light reflected by the original reading position to the light-receiving position 12 of the photoelectric light-receiving portion. A sensor 192 is arranged at the light-receiving position and has a photoelectric light-receiving portion.

LED chips 10e serve as illumination elements in the illumination means. The LED chips 10e are aligned in line at a pitch of several mm in a direction perpendicular to the drawing surface of FIG. 19. Each chip 10e is a square-shaped member, one side of which is 1 mm or less. The illumination system also includes an LED array board 193 having one major surface mounted with the LED chips 10e and made of an aluminum, glass, or epoxy board, a rod lens 10a made of glass, acrylic resin, or the like and designed to focus the illumination light beams from the LED chips 10e to increase the light quantity at the reading position 11, an adhesive layer (e.g., a heat-resistive two-side adhesive tape) 194 for elastically holding the LED array board 193 on the holder 8, and a lens housing 195 fixed on the board 193 to hold the rod lens 10a therein.

With the above structure, when the roller 2 is rotated in the direction of arrow C, the original 1 is fed in the direction of arrow B. In this case, light beams from the LED chips 10e are focused by the rod lens 10a. The focused beam is incident on the A side of the original 1 at the reading position 11. Light reflected by the original is incident on the light-receiving portion of the sensor 192 through the lens 13. The light signal is converted into an electrical signal by the sensor 192, thereby reading the image information on the A side of the original 1.

Figure 20:
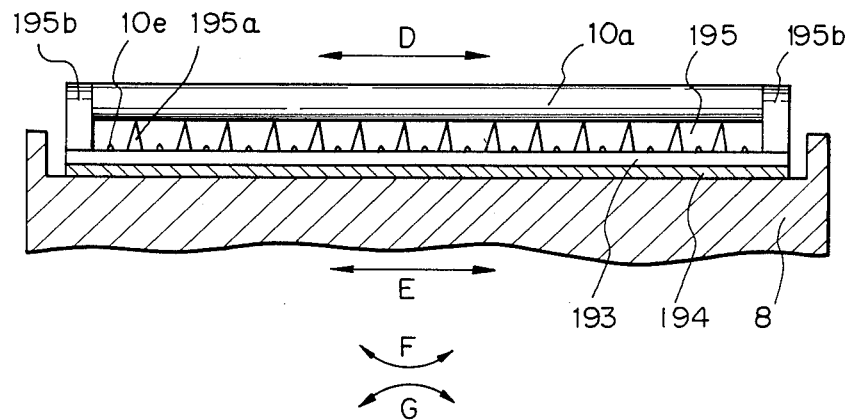
FIG. 20 is a sectional view showing a main part of the apparatus shown in FIG. 19.

FIG. 20 shows a detailed arrangement of an illuminating means or unit including the components (10a, 10e, 193, 194, and 195) in FIG. 19. An aligning member 195a is disposed in the lens housing 195 and abuts against the lower surface of the lens 10a, thereby accurately aligning the rod lens 10a with respect to the LED chips 10e. A stopper member 195b constituted by right and left side walls is formed to align the position of the rod lens 10a in the D direction (the longitudinal direction).

With the above arrangement, when the LED chips 10e are heated to increase the ambient temperature and even if the LED board 193 and the holder 8 are respectively expanded in the D and E directions, a difference between the expansion coefficients of the LED board 193 and the holder 8 can be absorbed by the adhesive layer 194 interposed therebetween. Therefore, warping of the board 193 and the holder 8 in the F or G direction can be prevented.

Figure 21:
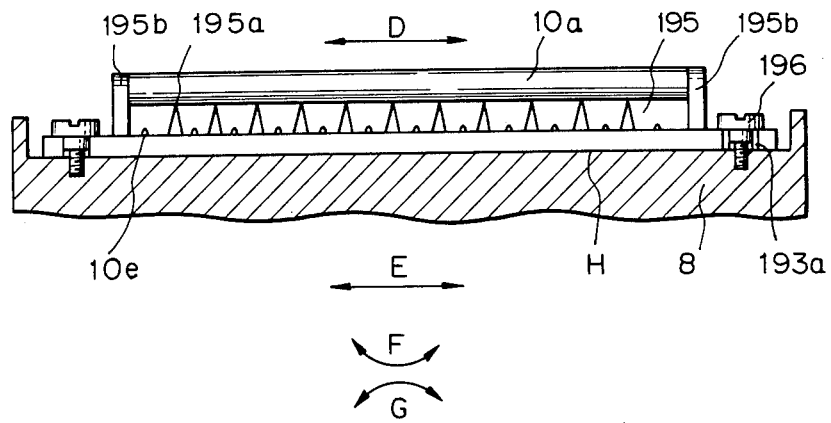
FIG. 21 is a sectional view showing a main part of an image reading apparatus according to still another embodiment of the present invention.

FIG. 21 shows an illumination unit according to a third embodiment of the present invention. In this embodiment, an LED board 193 is coupled to a holder 8 by screws instead of the adhesive layer. An elongated hole 193a is formed in the board 193 and extends in a heat expansion direction, i.e., the longitudinal direction (the D direction). A stepped screw 196 is inserted in the elongated hole 193a to couple the board 193 to the holder 8. Other arrangement of the third embodiment are the same as those of the second embodiment.

In the above embodiment, even if the board 193 and the holder 8 are respectively expanded in the D and E directions upon heating of the LED chips 10e, the contact portion H between the board 193 and the holder 8 is slid along the elongated hole 193, and their warping in the F and G directions can be prevented.

Figure 22:
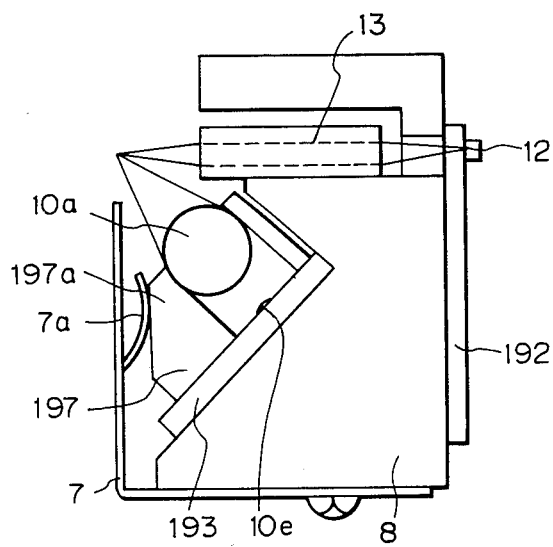
FIG. 22 is a sectional view showing a main part of an image reading apparatus according to still another embodiment of the present invention.

FIG. 22 shows a fourth embodiment of the present invention. A guide plate 7 is partially punched, and a partially punched portion is bent to constitute a portion 7a having a spring property. A lens housing 197 having an engaging portion 197 can be engaged with the portion 7a.

In the above embodiment, the illumination unit is biased by the spring force of the portion 7a and held against the holder 8. Even if a board 193 and the holder 8 are thermally expanded upon heating of the LED chips 10e, the assembly can be slid in a direction perpendicular to the drawing surface, thereby obtaining the same effect as in the third embodiment.

In each of the second to fourth embodiments, the LED array used in the CS is not firmly fixed to the structure (the holder 8) by the screws but fixed thereto in such a manner that the LED array is movable in the heat expansion direction (i.e., the longitudinal direction). Even if a difference is present between the heat expansion coefficients of the mounting member and the mounted member upon an ambient temperature rise caused by heat dissipation of the light-emitting elements such as an LED array, warping of the illumination unit caused by the bimetal effect can be prevented. Therefore, a good mounting surface state can be maintained, and hence a distance between the original surface and the light-emitting elements such as LED chips can be maintained constant. Therefore, the illuminance distribution on the original surface can be maintained uniform, thus achieving stable illumination.

Stable illumination allows high-quality, stable reading and at the same time a selection of LED boards and holder materials out of materials having different heat expansion coefficients. For example, in a conventional structure, an aluminum board is fixed in an aluminum die cast holder. However, a glass or epoxy board can be coupled to a resin holder. Therefore, versatility of the apparatus structure as well as design concepts for the light source and the structure can be improved to select an optimal material. Therefore, an inexpensive image reading apparatus can be provided.

Figure 23:
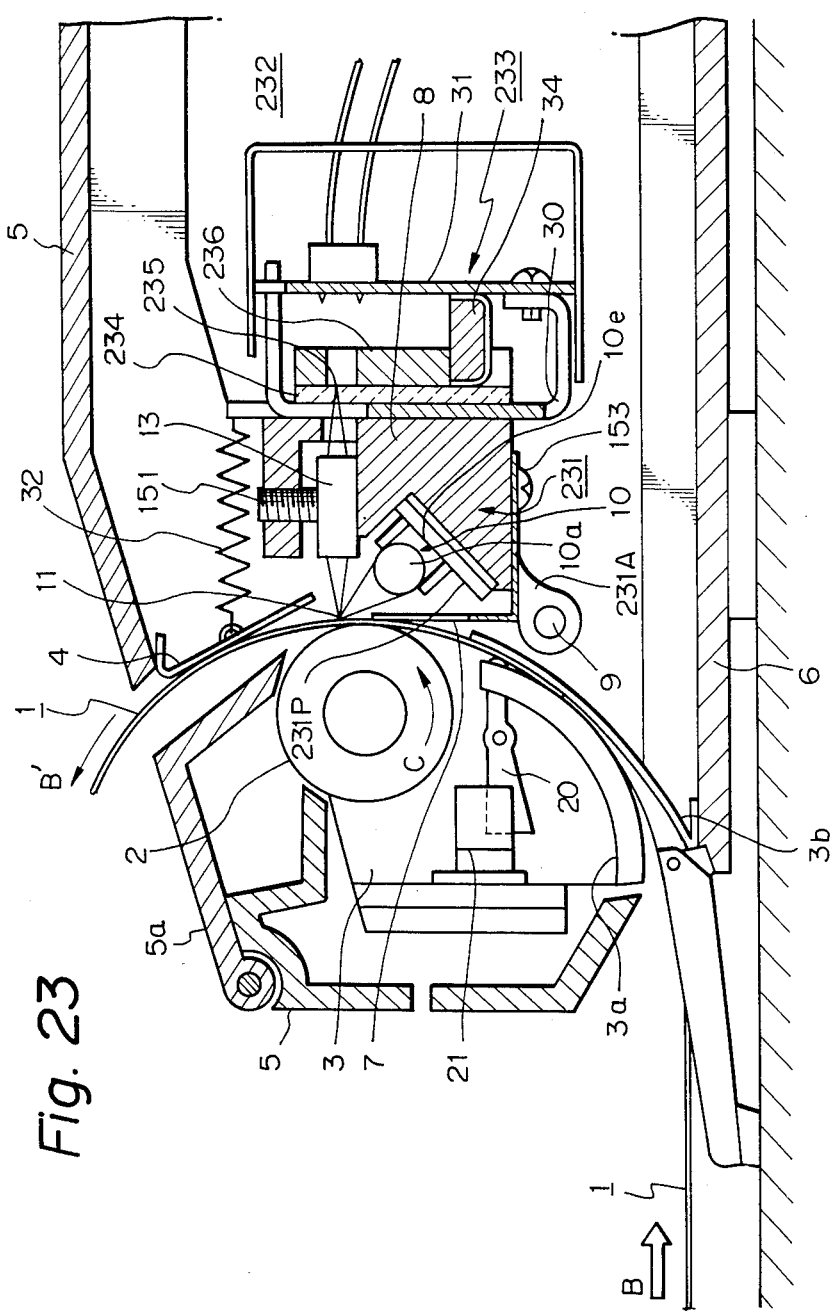
FIG. 23 is a sectional view of an original image reading apparatus using a CS according to still another embodiment of the present invention.

An original reading apparatus according to a fifth embodiment of the present invention will be described with reference to FIG. 23. The basic arrangement of the fifth embodiment is substantially the same as that of the first embodiment. In the apparatus exemplified in the fifth embodiment, the original is fed by a drive roller from the lower portion to an image reading position and is U-turned upward. The apparatus includes an equal-size sensor. An original 1 is fed by an original feed roller 2 in a direction indicated by arrow B. The roller 2 is rotated in a direction of arrow C. A pair of original guides 3a and 3b are disposed to define an arcuated original feed path. A discharge guide plate 4 is disposed in a discharge portion to guide the original 1 outside the apparatus. The guide 3a is coupled to an actuator 20. When the original 1 is guided between the guides 3a and 3b, a detector 21 detects the original in synchronism with the operation of the actuator 20. An openable cover 5a is pivotally supported by an upper cover 5 and is designed to be opened when jam occurs in the roller 2. A support frame (structure frame) 4 supports the roller 2 and the like. The bottom of the apparatus is covered by a lower cover (i.e., a bottom cover) 6. The image of the original 1 fed in the direction of arrow B by the original feed mechanism is read by a sensor array 235 through a reading optical unit 231 opposing the surface of the drive roller 2. The original is then discharged in a direction of arrow B' by the discharge guide 4.

The reading optical unit 231 will be described below. The unit 231 is supported by the wall of a structure frame 232 and is pivotal about a pin (not shown) through a hole (the center of rotation) 9 formed in a support portion 231A. An original press plate (a press guide) 7 is mounted on the unit 231 on the roller 2 side. A holder 8 of the unit 231 is made of an aluminum pultruded material, an aluminum die cast material, or a resin material. The press plate 7 is biased by a spring force of a coil spring 32 serving as a biasing means, thereby urging the original 1 at a reading position 11.

Figure 24:
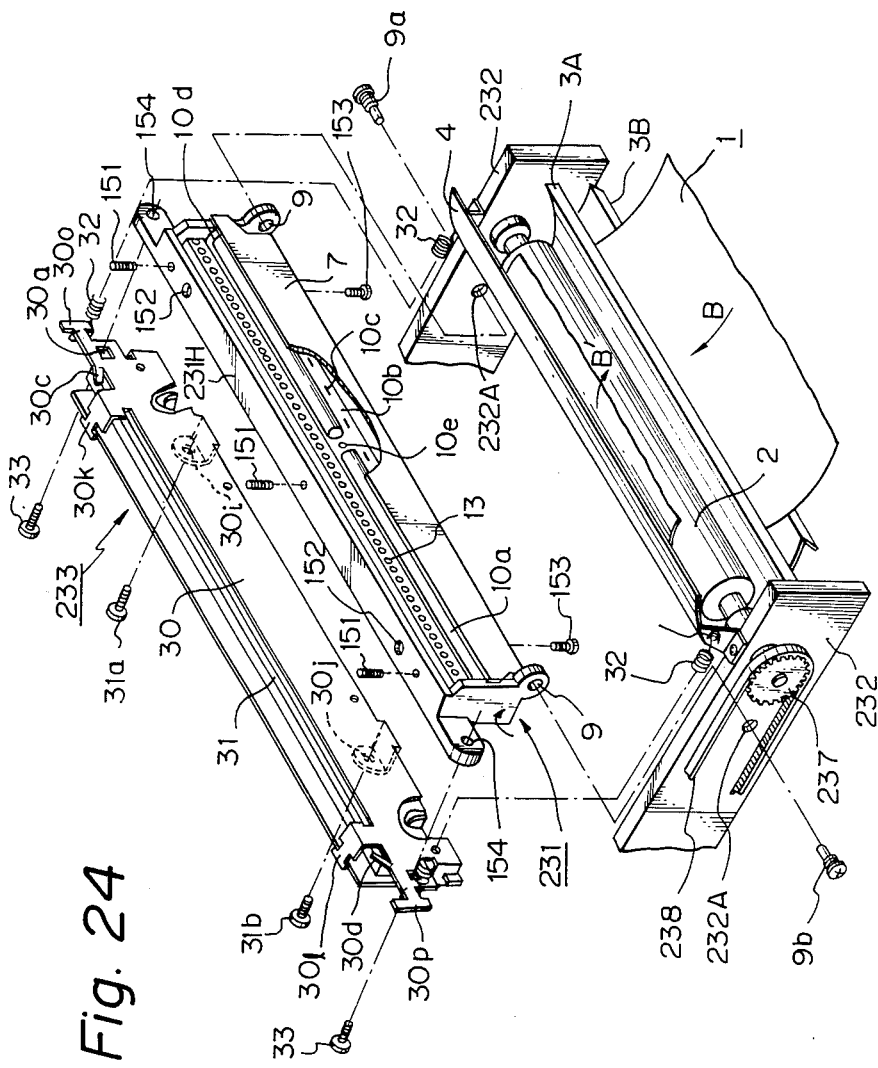
FIG. 24 is an exploded perspective view of the image reading apparatus shown in FIG. 23.

An illumination unit is composed of LED chips 10e. A rod lens 10a extends parallel to the LED array. An equal-size focusing lens 13 comprises a SELFOC lens and is arranged, as shown in FIG. 24. Referring to FIG. 24, screws 151 are threadably engaged with the holder 8 from the upper direction, i.e., from the direction perpendicular to the optical axis of the focusing lens 13. Holes 152 are formed in the upper surface of the holder 8 to allow an operator to adjust the position of the lens 13 in the optical axis thereof. A needle-like jig is inserted in the holes 152 to adjust the axial position of the lens 13. Screws 153 are used to fix the press plate 7 to the holder 8. One hole 9 formed in the holder support portion 231 is a circular hole, and the other thereof is an elongated hole.

Screws 33 are threadably engaged with tapped holes 154 to mount a sensor assembly unit 233 through a sensor mounting support plate 30. The LED chips 10e each having a small square shape are bonded on the board 10b in a one-dimensional array. A resistor 10c is soldered on the board 10b to control current values of the LED chips 10e. The rod lens 10a is accommodated in a lens housing 10d.

The structure of the sensor assembly unit 33 will be described below. Referring to FIGS. 23 and 24, the sensor assembly unit 233 includes a glass board 234 on which a sensor 235 is arranged, a rubber frame 236 integrally formed with the board 34, and a driver PCB 31. The glass board 234 integrally formed with the rubber frame 236 is aligned with the mounting support plate 30. The support plate 30 is integrally coupled to the PCB 31 to constitute the unit 233.

Figure 25:
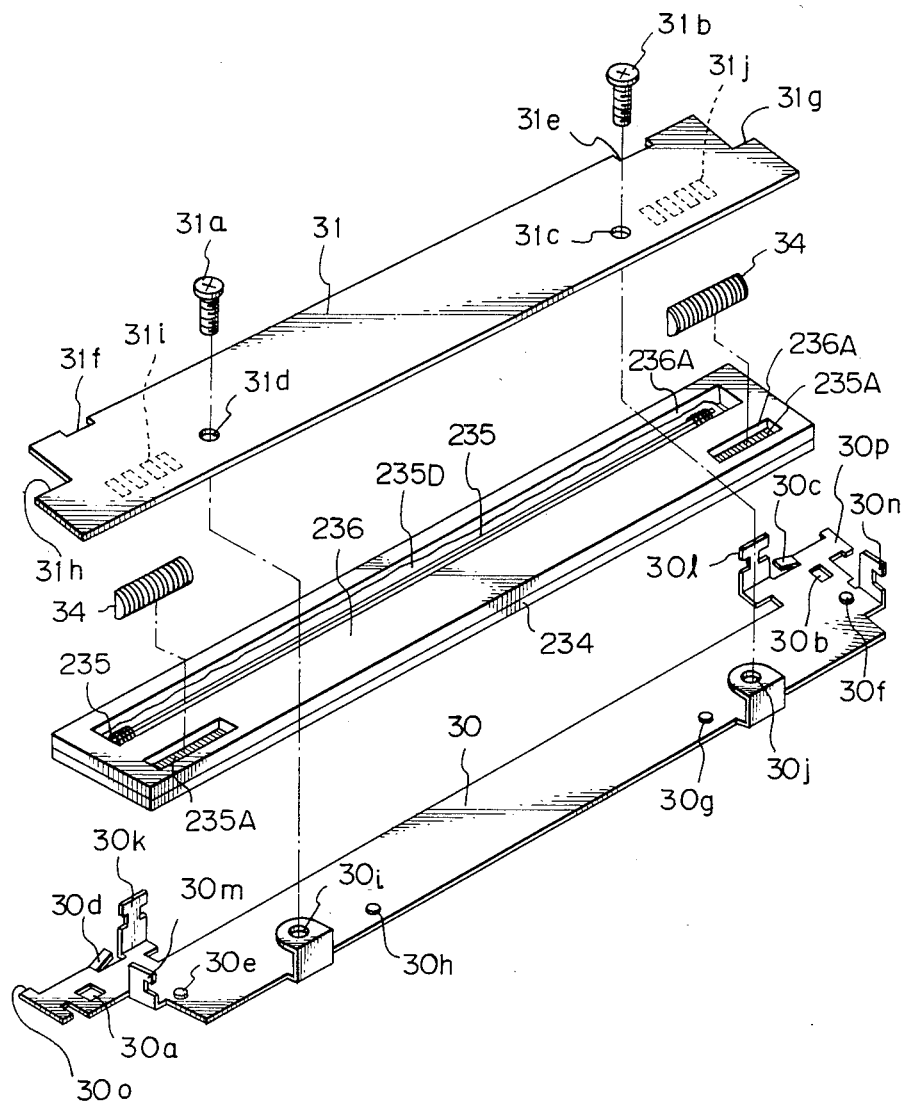
FIG. 25 is an exploded perspective view of a light-receiving element assembly unit of the CS shown in FIG. 23.

Referring to FIG. 25, the sensor 235 is formed in an array on the glass board 234 according to thin-film formation techniques. Pattern electrodes 235A, bonding wires 235B, and signal processing ICs (not shown) are formed on the glass board through a transparent adhesive agent according to deposition or the like. A member 235D is made of a compound such as rubber for protecting the bonding wires 235B and the compound is prevented from flowing from the rubber frame 236 during the fabrication. The rubber frame 236 has windows 236A for the pattern electrodes 235A.

The support plate 30 positions and supports the board 234. Embossed portions 30e and 30f project in the peripheral portion of the surface opposite to the glass board 234 so that the four sides of the glass board 234 can be aligned with the mounting support plate 30. Locking pawls 30m, 30n, 30k, and 30l are formed on the mounting support plate 30 to align the PCB 31 with the rubber frame 236 of the glass board 234. When the PCB 31 is aligned with the rubber frame 236, the PCB 31 is fixed using screw holes 30i and 30j. Screw holes 30b and 30e are formed to fix the assembly unit 233 to the optical system unit 231. Hook portions 30o and 30p are used to hook the spring 32 shown in FIG. 24.

The PCB 31 will be described with reference to FIG. 25. The PCB 31 has engaging ends 31g and 31h to be engaged with recesses of the locking pawls 30m and 30n of the support plate 30 at the time of assembly and engaging notches 31e and 31f to be engaged with H-shaped portions of the locking pawls 30k and 30l at the time of assembly. Pattern electrodes 31i and 31j corresponding to the pattern electrodes 235A of the glass board 234 are formed on the surface of the PCB 31 on the glass board 234 side. Interconnectors 34 having an illustrated shape are respectively inserted in the windows 236A of the pattern electrodes 235A. The PCB 31 is placed on the rubber frame 236 of the glass board 234 aligned on the mounting support plate 30. In this state, the engaging ends 31g and 31h and the engaging notches 31e and 31f are respectively locked by the locking pawls 30c and 30d and the locking pawls 30k and 30l while the PCB 31 is placed on the rubber frame 236 under pressure.

Thereafter, the PCB 31 is fixed on the support plate 30 by the screws 31a and 31b through the screw holes 33d and 33c, thereby properly urging the interconnectors 34 and hence holding the proper position of the glass board 234 while the pattern electrodes 235A are in tight contact with the patterns 33i and 33j.

Referring back to FIG. 24, assembly of the optical system unit 231 and the sensor assembly unit 233 into the original reading apparatus will be described below. The sensor assembly unit 233 is fixed to the optical system unit 231 by the screws 33. Subsequently, support pins 9a and 9b are inserted in holes 9 in the optical system unit 231 through screw holes 232 on the frame 232 side, respectively. The optical system 231 and the sensor assembly unit 33 are pivotally supported by the support pins 9a and 9b. The springs 32 are hooked between the hook portions 30o and 30p of the mounting support plate 30 and hook portions 4G of the guide plate 4. The entire unit is biased toward the drive roller 2 by the biasing forces of the springs 32. The press plate 7c mounted on an optical system unit holder 231H is brought into slight contact with the roller 2.

Referring to FIG. 24, a pulley 237 is mounted on a shaft of the roller 2 and is driven by a drive source (not shown) through a belt 238.

The reading operation of the image reading apparatus having the arrangement described above has been described in the previous embodiment, and a detailed description thereof will be omitted. In the CS according to the present invention, the sensor board having the LED array thereon is accurately clamped between the mounting/aligning support plate and the driver PCB. In this state, the interconnectors as the electrical connecting members can be aligned between the sensor board and the driver PCB. Therefore, workability. and therefore reliability of the reading apparatus can be greatly improved.

In the assembly state described above, the interconnectors as the electrical connecting members between the sensor board and the driver PCB are aligned. In addition, the alignment position is determined such that the interconnectors are surrounded by the two engaging portions and one fixing portion. Therefore, a proper urging force is applied between the electrical connection members and the sensor and driver boards, and the boards will not warp by the reaction force.

As has been described above, according to the present invention, the sensor board having the sensor array and the pattern electrodes thereon can be held by the mounting support plate in alignment with the driver board (printed circuit board). At the same time, the connecting members for electrical connections are elastically supported at predetermined positions between the printed circuit board and the sensor board while the sensor board is clamped between the mounting support plate and the printed circuit board. The printed circuit board is fixed to the mounting support plate by screws. Therefore, the mounting structure of the sensor board can be simplified and assembly can also be simplified. Moreover, the number of screws used in assembly can be reduced, and the number of assembly steps is reduced, thereby providing an inexpensive contact image sensor unit and an image reading apparatus having the unit.

According to the present invention, an insulating protective plate having fitting holes corresponding to the pattern electrodes is mounted on the sensor board surface having the pattern electrodes. The driver PCB is engaged with the support plate and can be fixed thereto. The sensor board is aligned and clamped between the support plate and the PCB. At the same time, the interconnectors for elastic electrical connections are fitted in the fitting holes of the protective plates, and the PCB is fixed to the sensor board. Therefore, the connecting members can be accurately aligned with the support member and the fitting holes on the sensor board, thereby assuring accurate electrical connections. The number of components such as fixing screws can be reduced to reduce low cost by improvement of workability.

Moreover, according to the present invention, the sensor board is clamped between the support plate mounted on the optical system unit and a driver PCB for driving the LED array. At the same time, the elastic connecting members for electrical connections are inserted at predetermined positions between the sensor board and the PCB. The PCB and the support plate can be coupled through the engaging portions and the fixing portions at least three locations so as to surround the connecting members. The connecting members can be correctly urged against the patterns of the boards at an appropriate urging force, thereby achieving good electrical connections. Moreover, the PCB and the support plate are free from warping. Therefore, unlike in the conventional apparatus, disconnections and incomplete electrical contacts of the sensor board and deformation of the sensor board held by the support plate do not occur. Therefore, the light-receiving position is not deviated from the ideal position, and the out-of-focus state can be prevented.

Furthermore, according to the present invention, the image information can be read at an optimal position without any influence of SLA ripple components. The staggered two lens arrays of the SLA need not be used. For this reason, an inexpensive one-dimensional sensor array can be used to reduce cost. The overall adjustment operations of the CS unit can be limited to a positional adjustment operation of the sensor and a focusing adjustment operation of the SLA. Therefore, the number of assembly steps can be reduced and an inexpensive unit and the image reading apparatus having the unit can be provided.

According to the present invention, a stable mounting state of the illuminating means and a uniform illuminance distribution on the original surface can be assured. Therefore, there is provided an inexpensive image reading apparatus for achieving high-quality image reading.

I claim:

1. An image sensor unit comprising:
   illumination means for illuminating light on an original;
   an image sensor for reading out image information on the original by reflection light of said illuminated light;
   holding means for holding said illumination means; and
   a mounting means for causing said holding means to hold said illumination means so that the relative displacement between said illumination means and said holding means is held constant in a direction along a surface of said holding means on which said illumination means is held by said holding means.

2. An image sensor unit according to claim 1, wherein said mounting member is a member made of elastic adhesion, which is provided on said surface.

3. An image sensor unit according to claim 1, wherein said mounting member includes a bonding member having a portion screwed to said holding means and a portion pushing said illumination means to said holding means in accordance with the screwed fixing, and an elongated hole provided in said illumination means for allowing causing said bonding member to pass therethrough to allow said relative displacement.

4. An image sensor unit according to claim 1, wherein said mounting means has a spring member for elastically pushing said illumination means to said holding means.

5. A picture image reading-out apparatus having an image sensor unit according to any one of claims 1 to 4.

6. A sensor unit comprising:
   a sensor substrate having a light receiving element array having a plurality of light receiving elements; and
   a circuit substrate and supporting plate for said light receiving elements,
   said sensor substrate being supported on said supporting plate by said circuit substrate through a connection member having an elastic characteristic and used for performing electrical connection between said sensor substrate and said circuit substrate.

7. A sensor unit according to claim 6, wherein a protection plate having holes corresponding to said connection member is inserted between said circuit substrate and said sensor unit.

8. An image reading out apparatus having a sensor unit according to any one of claims 6 and 7.

9. An image sensor unit comprising:
   a sensor substrate having a light receiving elements array having a plurality of light receiving elements;
   an optical system unit for guiding an image information received in said light receiving elements;
   a supporting plate attached on said optical system unit; and
   a circuit substrate for said light receiving elements, said sensor substrate being supported on said supporting plate by said circuit substrate through a connection member having an elastic characteristic and used for performing electrical connection between said sensor substrate and said circuit substrate, and said circuit substrate and said supporting plate being bonded each other by a engaging portion and fixing portion arranged on at least three areas.

10. A sensor unit according to claim 6, wherein a protection plate having holes corresponding to said connection member is inserted between said circuit substrate and said sensor unit.

11. An image reading out apparatus having a sensor unit according to any one of claims 9 and 10.

12. An image sensor unit ccmprising:
    a sensor substrate having a light receiving element array;
    an electrically insulating protection plate having a hole corresponding to a pattern electrode on said sensor substrate;
    a circuit substrate for said light receiving element array;
    a connection member having an elastic characteristics for performing the electrical connection between said sensor substrate and said circuit substrate; and
    a supporting plate for supporting said circuit substrate and said sensor substrate, said protection plate and said connection member being inserted between said sensor substrate and said circuit substrate such that said connection member is arranged so as to correspond to the hole of said protection plate, and said sensor substrate and said circuit substrate being supported by said supporting plate.

13. An image sensor unit according to claim 12, wherein said supporting plate is attached on an optical unit for guiding an image information to said light receiving element array.

14. An image sensor unit comprising:
    illumination means for illuminating an image information surface of an original;
    imaging means for imaging the reflection light of from the original by said illumination means at real size;
    a light receiving element provided on the imaging plane of said reflection light, for photoelectric converting the reflection light to read out image information;
    a structure for integrally holding said illumination means and said imaging means; and
    means for integrally bonding said light receiving element and a driving circuit for said light receiving element, said illumination means and said imaging means being separated from said light receiving element, said unit having a structure divided with respect to a surface perpendicular to an optical axis of said imaging means, the position of light receiving line of said light receiving element being adjustable on a surface perpendicular to said optical axis, and said illumination means, said imaging means, and said light receiving element being binded one another thereby to form an unit structure.

15. An image reading-out apparatus having an image sensor unit according to claim 14.

* * * * *

UNITED STATES PATENT AND TRADEMARK OFFICE
CERTIFICATE OF CORRECTION

PATENT NO. : 4,783,700

DATED : November 8, 1988

INVENTOR(S) : Hiromichi Nagane

It is certified that error appears in the above-identified patent and that said Letters Patent is hereby corrected as shown below:

COLUMN 2

Line 41, change "a" (second occurrence) to --52a--; and

Figure 1:
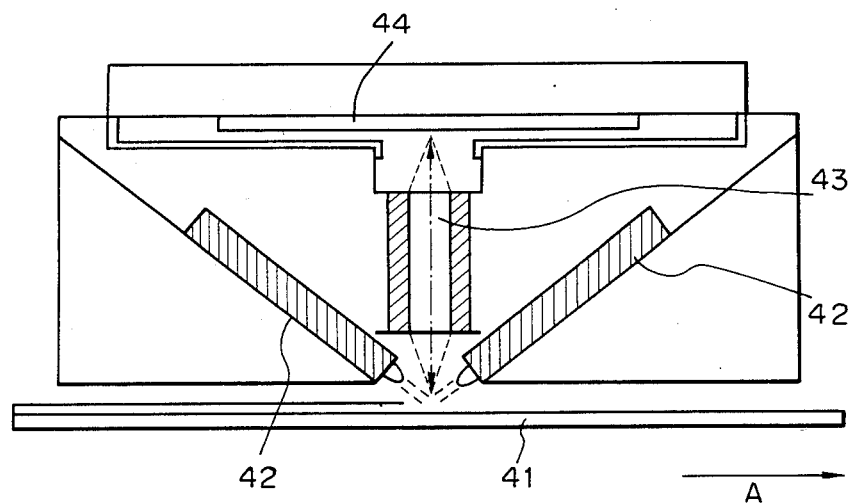
FIG. 1 is a view showing the principle of a conventional CS unit.
Figure 7:
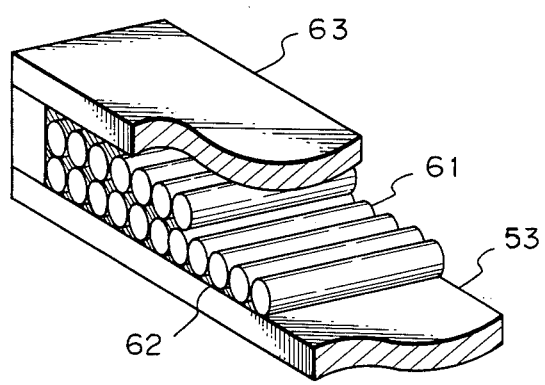
FIG. 7 is a perspective view showing a structure of an SLA.
Figure 2:
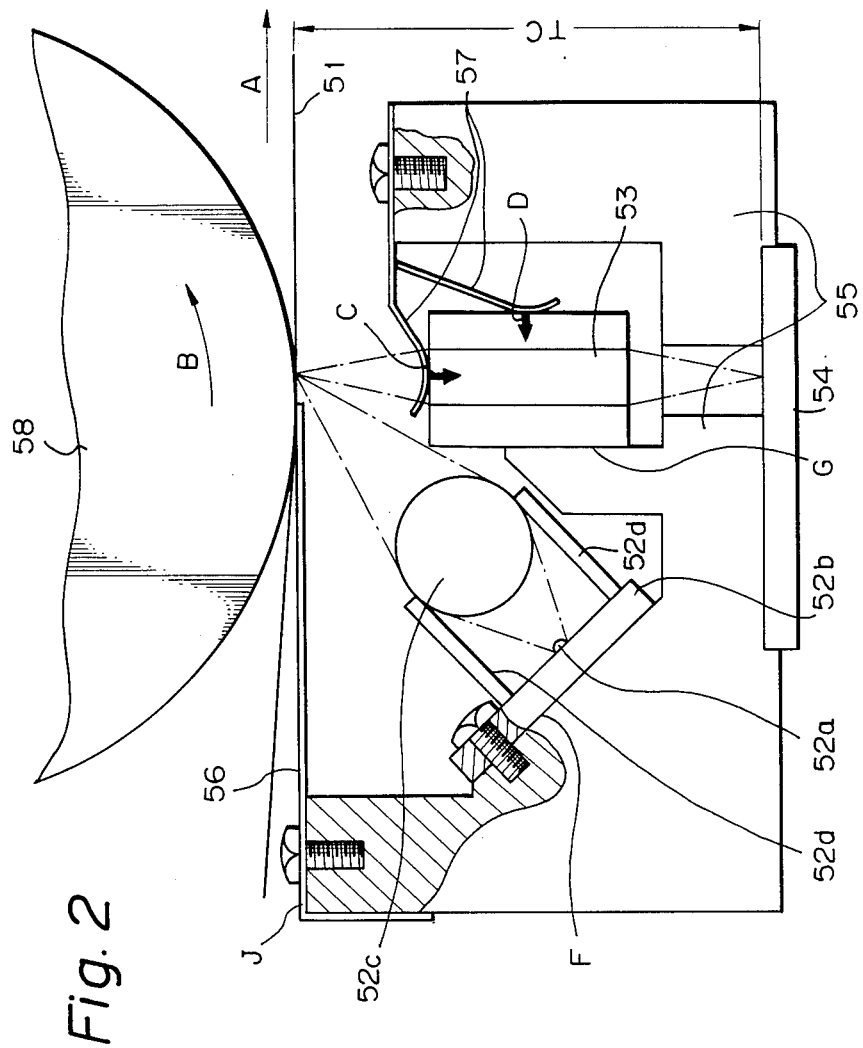
FIG. 2 is a sectional view showing another conventional CS unit.
Figure 4A:
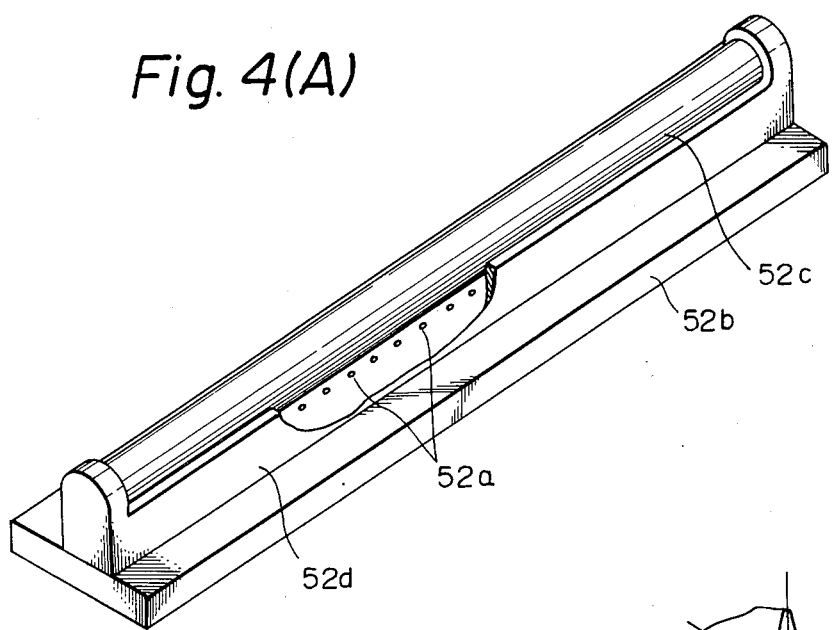
FIG. 4(A) is a perspective view of an LED sensor unit.
Figure 4B:
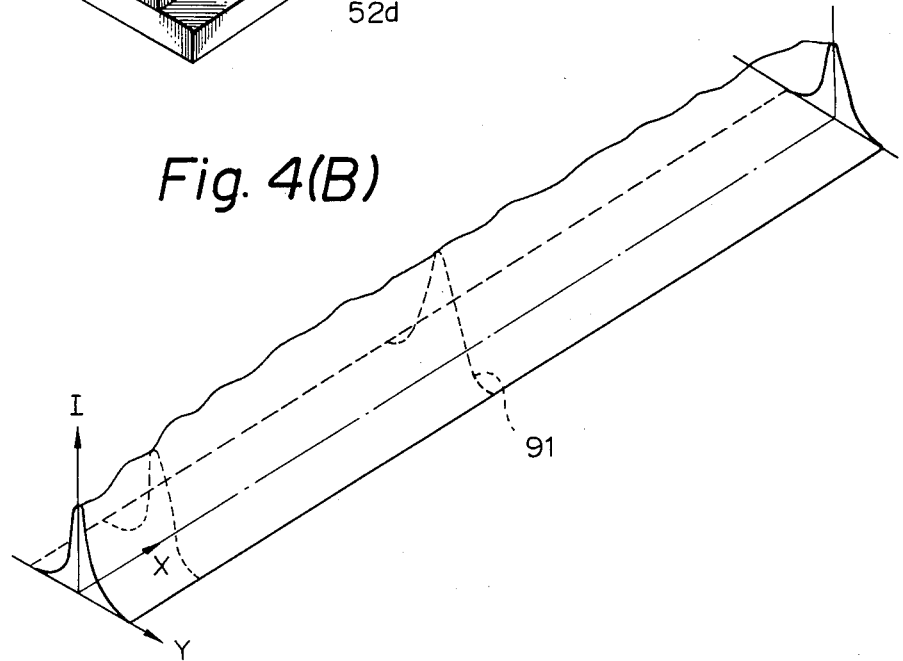
FIG. 4(B) is a view showing an illuminance distribution of the LED sensor unit shown in FIG. 4(A)
Figure 5A:
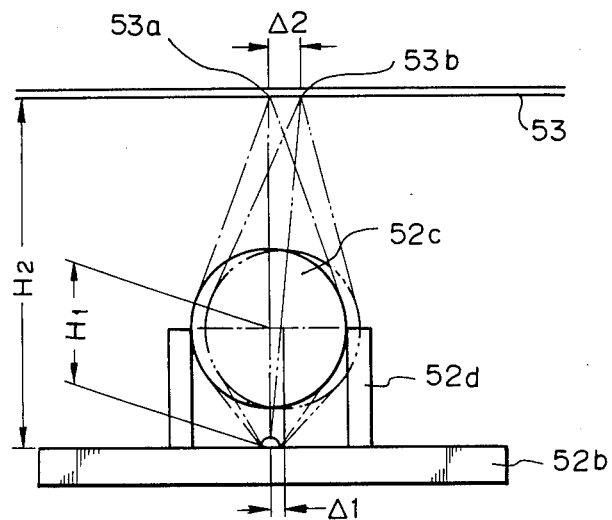
FIGS. 5(A) and 5(B) are sectional views of the LED sensor unit.
Figure 5B:
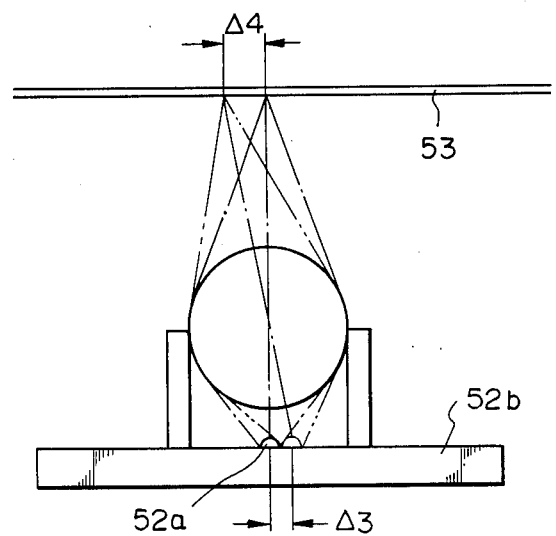
Figure 6:
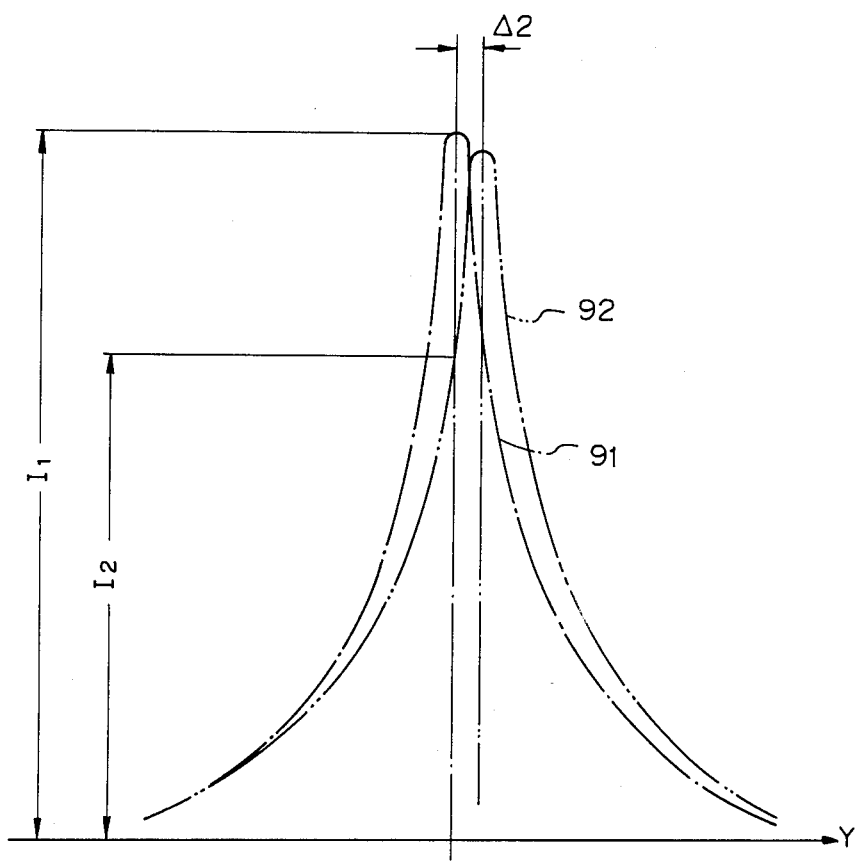
FIG. 6 is a graph showing a light quantity distribution of the LED sensor unit.
Figure 8:
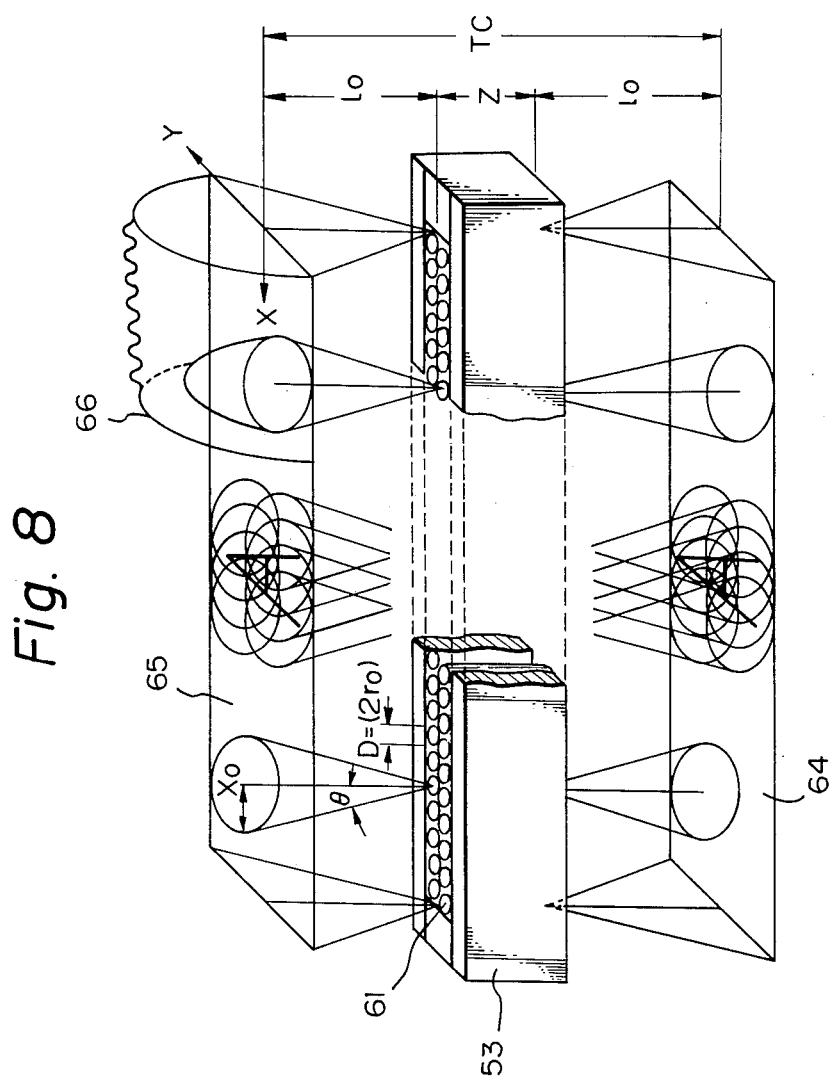
FIG. 8 is a view for explaining a focusing state of the SLA.
Figure 9:
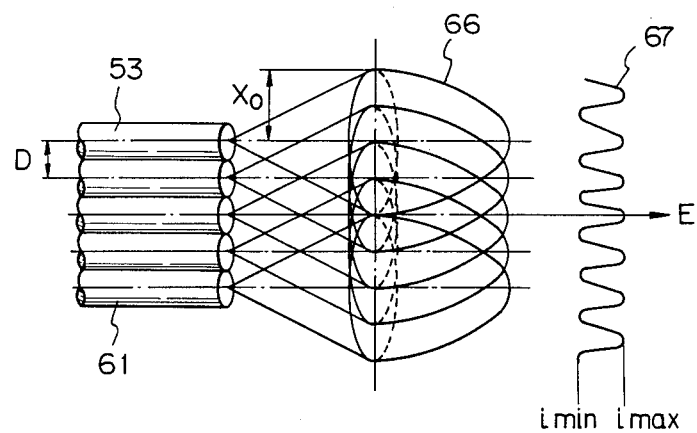
FIG. 9 is a graph for explaining a light quantity distribution on the focusing plane of the SLA.
Figure 10:
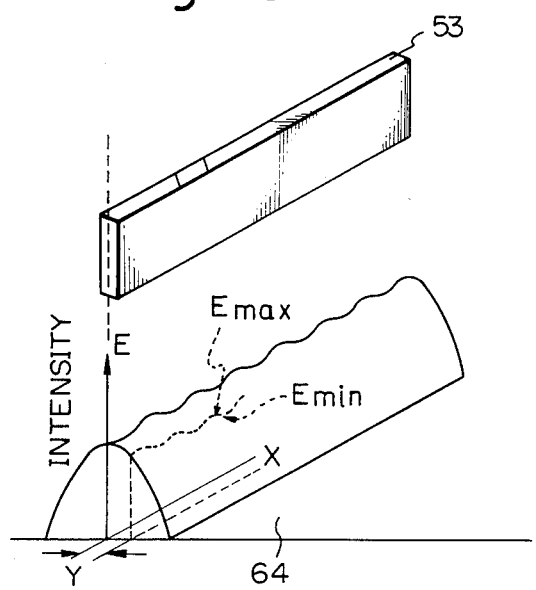
FIG. 10 is a perspective view showing the SLA and the light quantity distribution on the focusing plane.
Figure 11:
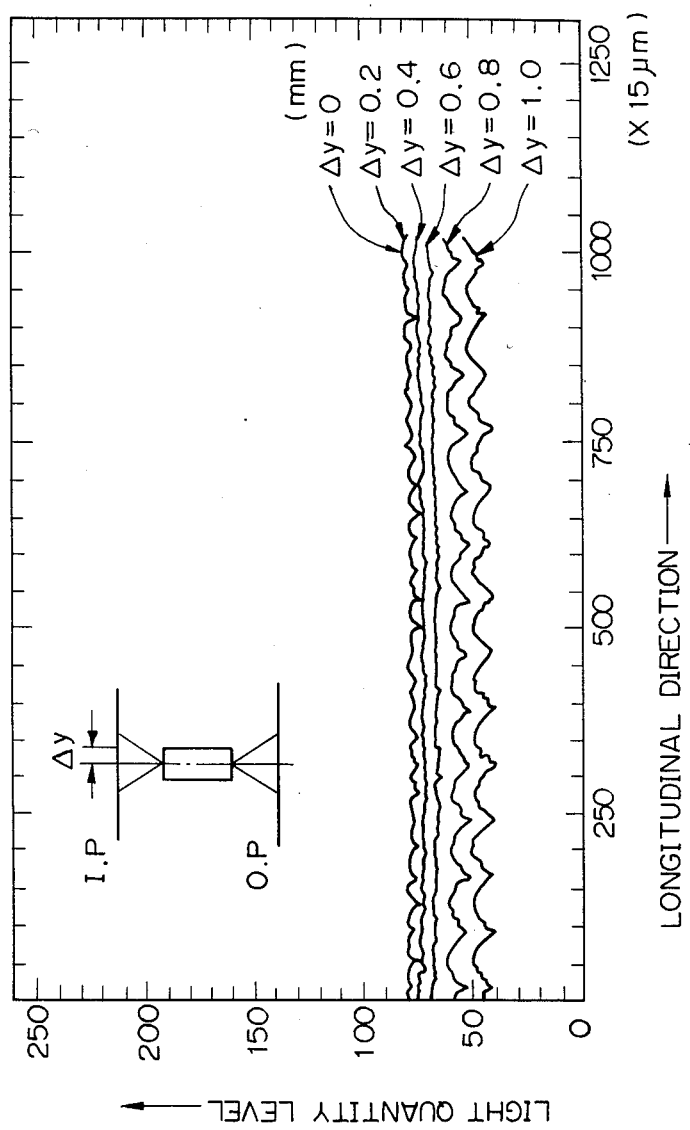
FIG. 11 is a graph for explaining the light quantity distribution of the SLA.

Line 48, change "FIG 4(B) a " to --FIG 4(B) shows a--.

COLUMN 3

Line 37, change "bondin" to --bonding--.

COLUMN 4

Line 33, change "sxrface" to --surface--; and

Line 50, change "changed" to --changed.--.

COLUMN 5

Line 4, change "degraded" to --degraded.--; and

Line 59, change "follows" to --follows.--.

COLUMN 6

Line 59, change "sesor" to --sensor--.

UNITED STATES PATENT AND TRADEMARK OFFICE
CERTIFICATE OF CORRECTION

PATENT NO. : 4,783,700         Page 2 of 3

DATED : November 8, 1988

INVENTOR(S) : Hiromichi Nagane

It is certified that error appears in the above-identified patent and that said Letters Patent is hereby corrected as shown below:

COLUMN 11

Line 28, change "Holes 8f and 8f" to --Holes 8f and 8f'--;

Line 30, change "hole 8f" to --hole 8f'--; and

Line 38, change "holes 8f and 8f" to --holes 8f and 8f'--.

COLUMN 12

Line 40, change "wwhere" to --where--;

Line 51, change "arrow ^" to -- arrow--;

Line 54, change " " to ----;

Line 60, change "line" to --lines--; and

Line 64, change "arrow " to -- arrow--.

COLUMN 13

Line 8, change "arrow ^" to -- arrow--; and

Line 24, change "arrow ^" to -- arrow(^)--.

UNITED STATES PATENT AND TRADEMARK OFFICE
CERTIFICATE OF CORRECTION

PATENT NO. : 4,783,700  Page 3 of 3

DATED : November 8, 1988

INVENTOR(S) : Hiromichi Nagane

It is certified that error appears in the above-identified patent and that said Letters Patent is hereby corrected as shown below:

COLUMN 16

Line 36, change "unit 33" to --unit 233--; and

Line 39, change "board 34" to --board 234--.

COLUMN 17

Line 54, change "workability." to --workability--.

Signed and Sealed this

Fifth Day of June, 1990

Attest:

HARRY F. MANBECK, JR.

*Attesting Officer*  *Commissioner of Patents and Trademarks*